(12) United States Patent
Sakai et al.

(10) Patent No.: US 7,912,329 B2
(45) Date of Patent: Mar. 22, 2011

(54) OPTICAL-SWITCH TESTING APPARATUS, OPTICAL-SIGNAL SWITCHING APPARATUS, OPTICAL-SWITCH TESTING METHOD, AND CONTROL METHOD FOR OPTICAL-SIGNAL SWITCHING

(75) Inventors: Yoshio Sakai, Kawasaki (JP); Yuji Tochio, Kawasaki (JP); Kazuyuki Mori, Kawasaki (JP); Atsuo Ishizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/542,975

(22) Filed: Aug. 18, 2009

(65) Prior Publication Data

US 2009/0304329 A1      Dec. 10, 2009

Related U.S. Application Data

(62) Division of application No. 11/761,958, filed on Jun. 12, 2007, now Pat. No. 7,596,290, which is a division of application No. 10/876,645, filed on Jun. 28, 2004, now Pat. No. 7,239,773.

(51) Int. Cl.
*G02B 6/26* (2006.01)
*G02B 6/42* (2006.01)
*G01R 31/08* (2006.01)
*H04Q 11/00* (2006.01)
*H04B 10/08* (2006.01)
*H04J 14/00* (2006.01)

(52) U.S. Cl. ............... 385/18; 398/12; 398/45; 370/250; 370/360

(58) Field of Classification Search .................... 385/18; 398/12, 45; 370/250, 360
See application file for complete search history.

(56) References Cited

U.S. PATENT DOCUMENTS

| 6,813,410 | B2 | 11/2004 | Oikawa |
| 2002/0109076 | A1 * | 8/2002 | Tochio et al. .......... 250/214 SW |

FOREIGN PATENT DOCUMENTS

| JP | 9-508218 | 8/1997 |
| JP | 2002-236264 | 8/2002 |
| JP | 2002-328316 | 11/2002 |

(Continued)

OTHER PUBLICATIONS

Ishizuka, A. et al., High-Speed 3-Dimensional MEMS Optical Switch, 2002 Communications Conference of the Institute of Electronics, Information, and Communication Engineer, 2002 (5 pp.).

(Continued)

*Primary Examiner* — Mark A. Robinson
*Assistant Examiner* — Jerry Blevins
(74) *Attorney, Agent, or Firm* — Staas & Halsey LLP

(57) ABSTRACT

A light source supplies optical signal to an optical switch and a detector detects light receiving level. A control unit changes a deflection control amount for changing an angle of a tilt mirror, and outputs the deflection control amount to a driving unit. When an input and an output ports are same, optical offset of the tilt mirror is calculated based on optimal angle at which the light detector detects an optimal point of the light receiving level. Whenever the input and the output port are different, a structure parameter of the tilt mirror is calculated based on the optical offset and the optimal angle. The optical offset and the structure parameter are stored in a memory as a test result.

5 Claims, 15 Drawing Sheets

FOREIGN PATENT DOCUMENTS

| | | |
|---|---|---|
| JP | 2002-365564 | 12/2002 |
| JP | 2003-29175 | 1/2003 |
| JP | 2003-43386 | 2/2003 |
| WO | 95/20301 | 7/1995 |

OTHER PUBLICATIONS

Office Action mailed Sep. 11, 2006 in U.S. Appl. No. 10/876,645 (8 pp.).

Office Action mailed Jan. 22, 2008 in corresponding Japanese Application No. 2003-26546 (9 pp.).

Notice of Allowance, mailed Mar. 7, 2007, in U.S. Appl. No. 10/876,645 (10 pp.).

Notice of Allowance, mailed May 22, 2009, in U.S. Appl. No. 11/761,958 (20 pp.).

\* cited by examiner

FIG.3A

| INPUT PORT NUMBER (i) | OUTPUT PORT NUMBER (j) | OPTICAL OFFSET $\theta_{off}$ | | | |
|---|---|---|---|---|---|
| | | INPUT MIRROR | | OUTPUT MIRROR | |
| | | X AXIS | Y AXIS | X AXIS | Y AXIS |
| #1 | #1 | | | | |
| #2 | #2 | | | | |
| . | . | | | | |
| . | . | | | | |
| . | . | | | | |
| #N | #N | | | | |

5a, 4N PARAMETERS

FIG.3B

| INPUT PORT NUMBER (i) | INPUT MIRROR STRUCTURE PARAMETER A | | | |
|---|---|---|---|---|
| | X AXIS | | Y AXIS | |
| | POSITIVE SIDE | NEGATIVE SIDE | POSITIVE SIDE | NEGATIVE SIDE |
| #1 | | | | |
| #2 | | | | |
| . | | | | |
| . | | | | |
| . | | | | |
| #N | | | | |

5b, 4N PARAMETERS

FIG.3C

| OUTPUT PORT NUMBER (j) | OUTPUT MIRROR STRUCTURE PARAMETER A | | | |
|---|---|---|---|---|
| | X AXIS | | Y AXIS | |
| | POSITIVE SIDE | NEGATIVE SIDE | POSITIVE SIDE | NEGATIVE SIDE |
| #1 | | | | |
| #2 | | | | |
| . | | | | |
| . | | | | |
| . | | | | |
| #N | | | | |

5c, 4N PARAMETERS

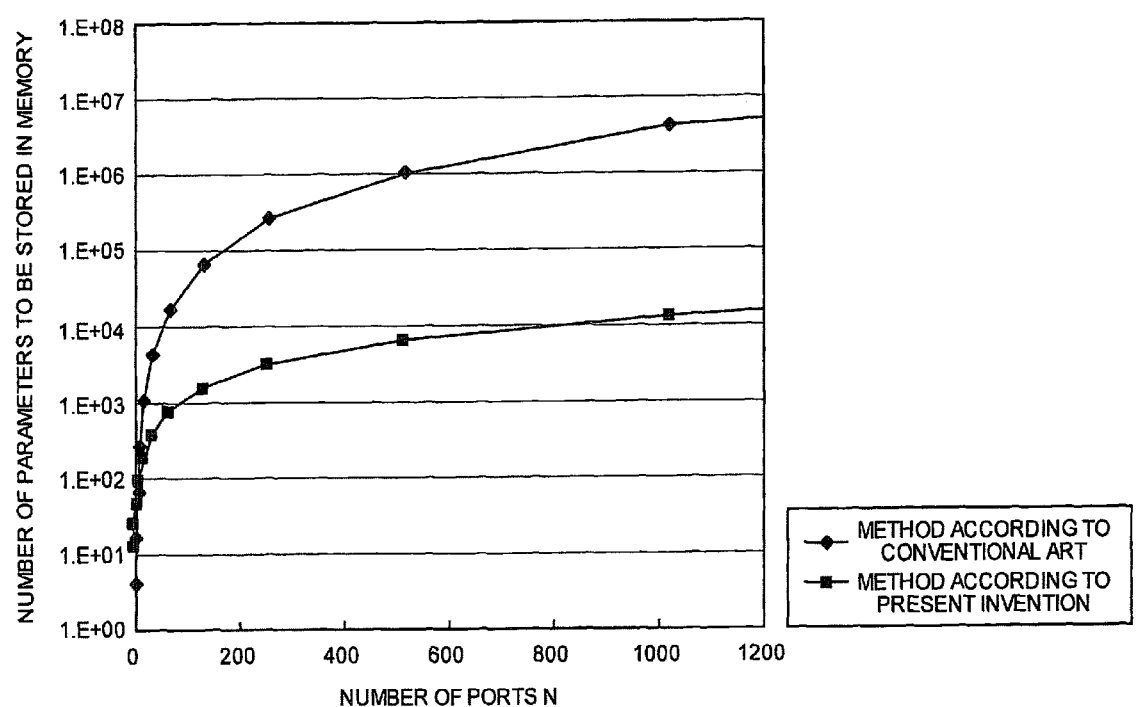

FIG.9

| INPUT MIRROR | OUTPUT MIRROR | DEFLECTION CONTROL AMOUNT 25 | |
| --- | --- | --- | --- |
| | | INPUT MIRROR | OUTPUT MIRROR |
| #1 | #1 | $V_{in1}$ | $V_{out1}$ |
| ⋮ | ⋮ | ⋮ | ⋮ |
| #N | #N | $V_{in1}$ | $V_{outN}$ |

FIG. 15

| INPUT PORT NUMBER (i) | OUTPUT PORT NUMBER (j) | DEFLECTION CONTROLLED VARIABLE | | | |
|---|---|---|---|---|---|
| | | INPUT MIRROR | | OUTPUT MIRROR | |
| | | X AXIS | Y AXIS | X AXIS | Y AXIS |
| #1 | #1 | | | | |
| #1 | #2 | | | | |
| . | . | | | | |
| . | . | | | | |
| . | . | | | | |
| #1 | #N | | | | |
| #2 | #1 | | | | |
| #2 | #2 | | | | |
| . | . | | | | |
| . | . | | | | |
| . | . | | | | |
| #2 | #N | | | | |
| . | . | | | | |
| . | . | | | | |
| . | . | | | | |
| . | . | | | | |
| . | . | | | | |
| #N | #1 | | | | |
| #N | #2 | | | | |
| . | . | | | | |
| . | . | | | | |
| . | . | | | | |
| #N | #N | | | | |

{ N WAYS (first block)
{ $N^2$ WAYS (entire table)

4 PIECES OF DEFLECTION CONTROL AMOUNT FOR ONE PASS

OPTICAL-SWITCH TESTING APPARATUS, OPTICAL-SIGNAL SWITCHING APPARATUS, OPTICAL-SWITCH TESTING METHOD, AND CONTROL METHOD FOR OPTICAL-SIGNAL SWITCHING

CROSS-REFERENCE TO RELATED APPLICATIONS

This application is a divisional application of Ser. No. 11/761,958, filed Jun. 12, 2007 now U.S. Pat. No. 7,596,290, which is a divisional of Ser. No. 10/876,645, filed Jun. 28, 2004 now U.S. Pat. No. 7,239,773, which claims the benefit of priority from the prior Japanese Patent Application No. 2003-026546, filed on Feb. 3, 2003, the entire contents of which are incorporated herein by reference.

BACKGROUND OF THE INVENTION

1) Field of the Invention

The present invention relates to an optical-switch testing apparatus having a microelectromechanical systems (MEMS) mirror array, and more particularly, to an optical-switch testing apparatus and an optical-switch testing method to obtain a deflection control amount with efficiency and high precision, an optical-signal switching apparatus equipped with the optical switch to stabilize light output, and a control method for the optical-signal switching apparatus.

2) Description of the Related Art

Recently, along with the rapid spread of internet, traffic volume is remarkably increasing. One of the methods to cope with the increasing traffic and to configure a large capacity optical communication nets is a wavelength division multi-plexing (WDM) system. A backbone optical network based on the WDM system is an optical cross-connect (OXC) system. The OXC system has a structure in which plural optical-signal switching apparatuses are connected mutually on light transmission paths consisting of optical fibers.

WDM signals are input to the optical-signal switching apparatus via optical fibers, and the wavelength of optical signals in a same light transmission path is transmitted in multiplexed manners. Optical switches are arranged inside the optical-signal switching apparatus, and light paths of the optical signals are changed to other light paths in unit of wavelength by the optical switches, and may be output to other light transmission paths.

According to the OXC system employing optical-signal switching apparatuses, when an optical fiber configuring a certain light transmission path becomes faulty, light paths are switched by the internal optical switch instantaneously, and thereby optical signals are diverted to an optical fiber configuring other light transmission path or an optical fiber in other route. Accordingly, even when a trouble occurs with a light transmission path, a recovery can be made at high speed, and light paths can be switched in unit of wavelength.

FIG. 13 is a perspective view of an optical switch. An optical switch 100 of 3-dimensinal type MEMS includes two MEMS mirror arrays 101 and 102 manufactured by application of Bulk micromachine technology, and two collimator arrays 103 and 104 that make light go into and go out from these two MEMS mirror arrays 101 and 102. The MEMS mirror arrays 101 and 102 are manufactured by etching raw material boards and forming their supporting bodies and mirror forming portions into desired shapes, and by forming mirror surfaces and electrodes into thin films. The use of the MEMS mirror arrays 101 and 102 enables to structure an optical switch that changes light paths spatially in 3-dimensional manners.

The MEMS mirror arrays 101 and 102 includes plural tilt mirrors 105 and 106 in matrix shape, respectively. The angle of each of the tilt mirrors 105 and 106 may be changed independently in two axis directions (X and Y), and by changing the incident angle of incoming light A, the optical paths of the light A may be changed to arbitrary angles. In the collimator arrays 103 and 104, a number of input and output ports corresponding to the plural tilt mirrors 105 and 106 of the MEMS mirror arrays 101 and 102 are formed in matrix shape, respectively.

The technology concerning such a 3-dimensional type MEMS optical switch is disclosed, for example, in "High Speed Switching 3-Dimensional Type MEMS Optical Switch", technical digest of Communication Society Conference, p. 447, IEICE, 2002. In addition, the technology concerning MEMS mirrors that have sinking comb type electrodes enabling to change angles of respective mirrors in two axis directions is disclosed, for example, in Japanese Patent Application Laid-Open Publication No. 2002-328316.

The optical switch employing such MEMS mirror arrays 101 and 102 is superior to other switches in viewpoints of compact size, wavelength independency, polarized wave independency and other features, therefore attracts much attention of those skilled in the art. In addition, an optical-signal switching apparatus employing such an optical switch 100 of 3-dimensional type MEMS as mentioned above realizes reduction of light loss, large capacity, and multiple channels.

In the optical switch 100, to the collimator arrays 103 and 104, end portions of optical fibers (not shown) of plural ports (103-1 to 103-N, 104-1 to 104-N) are arranged, respectively. In the example shown in the figure, the collimator array 103 at the input side and the collimator array 104 at the output side are arranged in parallel so that the respective light input directions should face forward in the figure, while the respective light output directions should face backward in the figure.

The collimator arrays 103 and 104 have plural ports (103-1 to 103-N, 104-1 to 104-N) in matrix shape in vertical and horizontal directions, respectively. To each of the plural ports, an end portion of an optical fiber (not shown) is fixedly arranged for inputting and outputting optical signals. The backward surface of each port of the collimator arrays 103 and 104 is end surface processed for making light go out from an optical fiber.

At the back of the collimator arrays 103 and 104, the MEMS mirror arrays 101 and 102 are arranged in correspondence to the arrangement interval between the collimator arrays 103 and 104. The MEMS mirror arrays 101 and 102 are arranged so as to be respectively inclined by 45 degrees to the direction of the light path A between the collimator arrays 103 and 104. In addition, the collimator arrays 103 and 104 are arranged so as to be at right angles to each other. The light input to each port of the collimator array 103 at the input side is made to go out as a light path A, and by the MEMS mirror array 101 at the input side, the light path A is reflected toward the MEMS mirror array 102 at the output side. Thereafter, by the MEMS mirror array 102, the light path A is reflected toward the collimator array 104, and may be output through each port of the collimator array 104.

The input mirror 105 and the output mirror 106 include a deflecting unit (not shown) having the sinking comb type electrode. By supplying deflection control amounts (driving voltage) corresponding to angle changes to this deflecting unit, the angles of the input mirror 105 and the output mirror 106 are continuously changed in correspondence to the values of the driving voltage.

At the time of a through pass, the light A that is output from the port 3 (103-3) of the collimator array 103 is reflected by the input mirror 105-3 of the MEMS mirror array 101, then reflected by the output mirror 106-3 of the MEMS mirror array 102, and is made to go into the port 3 (104-3) of the collimator array 104. At this moment, the surfaces of the input mirror 105-3 of the MEMS mirror array 101 and the output mirror 106-3 of the MEMS mirror array 102 are in a parallel status with the surfaces of the main bodies of the MEMS mirror arrays 101 and 102. In this status, angle change control to the input mirror 105-3 and the output mirror 106-3 is not carried out.

At the time of a cross pass, angle change control to the input mirror 105-3 of the MEMS mirror array 101 and the output mirror 106-3 of the MEMS mirror array 102 is carried out, thereby, the reflection direction of the incident light of the light A to the port 3 (103-3) of the collimator array 103 is deflected, and the light is made to go into an arbitrary port (one of 104-1 to 104-N) of the collimator array 104. In this manner, the optical switch 100 enables to change light input from plural ports to an arbitrary port and output light thereto. An optical-signal switching apparatus to be described later herein is the device that switches optical signals of plural systems on a light transmission path by this port change.

While, in the optical switch 100, in both a through pass and a cross pass, the light path (the optical axis of the light A) may go with displacement into an optical fiber at the output side connected to the collimator array 104 at the output side. This displacement of a light path will occur from factors including the structural characteristics of the MEMS mirror arrays 101 and 102, angle displacement of a mirror that actually works to the controlled variables at the moment of angle change, displacement of component arrangement at assembly, and so forth. Further, this light path displacement becomes a factor to increase light loss of an optical-signal switching apparatus equipped with the optical switch 100. Control technologies to decrease light loss in such an optical switch are disclosed, for example, in Japanese Patent Application Laid-Open Publication No. H9-508218 and Japanese Patent Application Laid-Open Publication No. 2002-236264.

FIG. 14 is a flowchart of a test procedure for obtaining a deflection control amount of an optical switch according to a conventional technology. The test is carried out on the assumption that there is no displacement of component arrangement at assembly of the optical switch 100. By the way, for the sake of convenience, the following explanation is made with the collimator array 103 side as the light input side, with the collimator array 104 as the light output side, and with the tilt mirror 105 of the MEMS mirror array 101 as an input mirror, and with the tilt mirror 106 of the MEMS mirror array 102 as an output mirror.

In the first place, in the setting of the input and output ports, an input port of the collimator array 103 and an output port of the collimator array 104 are set (step S101). Then, a deflection angle with which light should be output from the output port set at the collimator array 104 side, when light is input from the input port set at the collimator array 103 side, is calculated (step S102). This deflection angle is calculated on the basis of the theoretical values necessary for angle changes of the input mirror 105 of the MEMS mirror array 101 and the output mirror 106 of the MEMS mirror array 102.

In the next place, by use of the calculated deflection angle, angle change control is carried out to the respective deflecting units (not shown) of the input mirror 105 of the MEMS mirror array 101 and the output mirror 106 of the MEMS mirror array 102. In concrete, the deflecting units are driven (step S103), and thereby, the angles of the two axes (X and Y) of the input mirror 105 and the output mirror 106 are changed in continuous manners. At the same time, the light receiving level of the light A that is output from the output port of the collimator array 104 is detected by a light detector (not shown) (step S104), and the optimal point of light loss is obtained (step S105).

Until the optimal point is obtained (step S105: No), the driving of the deflecting units by the step S103, and the detection of the light receiving level by the step S104 are continued by feedback control. When the optimal point is obtained (step S105: Yes), the angle position corresponding to this optimal point is taken as a deflection control amount. The optimal point is the angle position at the moment when the light loss between the previously set input and output ports becomes minimum, namely, when the light receiving level is detected maximum.

Through the process mentioned above, the deflection control amounts at the input port and the output port set in the step S101, that is, the input port of the collimator array 103, and the output port of the collimator array 104, are obtained. Thereafter, a new combination of an input port and an output port is set, and the process mentioned above is carried out thereon (step S106: No). When the optimal points are obtained for all the ports of the collimator arrays 103 and 104 in matrix shapes (step S106: Yes), the deflection control amounts for all the combinations of input and output ports by the through pass and cross pass are obtained.

However, in the conventional art, in the instance of displacement of component arrangement at assembly of the optical switch 100, the deflection control amount at which the light receiving level of output becomes maximum will shift from the theoretical value. As a consequence, the process to obtain the deflection control amount at which the light receiving level becomes maximum, in other words, the number of times of feedback control in the steps S103-S105 will increase, and test time will increase accordingly, which has been a problem with the conventional art.

Further, in the test process mentioned above, the deflection control amount is calculated by use of the theoretical values of the MEMS mirror arrays 101 and 102. Accordingly, when there is conspicuous fluctuation peculiar to each of the input mirror 105 of the MEMS mirror array 101 and the output mirror 106 of the MEMS mirror array 102, the displacement in the calculated value of the deflection control amount will become large, and test time will increase accordingly, which has been another problem with the conventional art.

When the number of the input ports of an optical switch is N, and the number of the output ports thereof is N, the number of changeable combinations by a through pass and a cross pass is $N^2$ ways. In the optical switch 100 shown in FIG. 13, because displacement in component arrangement occurs at assembly, when the number of the input port is defined as i, and the number of the output port is defined as j, even in a test of a through pass in which it stands that i=j, deflection control must be executed. In addition, with regard to this displacement of component arrangement that occurs at assembly, even in a test of a cross pass in which it stands that i≠j, too, deflection control must be executed. Therefore, according to the conventional test process, because the time for testing a certain pass is around five minutes, in order to test the deflection control amount of an optical switch of N×N, test time of $5 \times N^2$ minutes is required as a whole.

While, the optical switch testing process mentioned above is carried out by use of an optical-switch testing apparatus. An optical-switch testing apparatus includes a light source that outputs optical signals to respective input ports of an optical switch, a light detector that detects the light receiving levels of optical signals obtained from respective output ports of the optical switch, and a control circuit that executes the testing process mentioned above. The control circuit memorizes the deflection control amounts obtained by the testing process mentioned above. Accordingly, the deflection control amounts obtained as the results of testing the optical switch are stored into a memory as control parameters peculiar to each optical switch.

The optical-signal switching apparatus into which an optical switch is assembled reads parameters stored in this memory, and thereby operates actual optical signal change actions. For example, when the optical-signal switching apparatus receives a change instruction, it reads the deflection control amounts corresponding to the set input and output ports from the memory and thereby drives the deflecting units.

FIG. 15 is a table of memory contents to store the deflection control amount. The contents of parameters that are stored in a memory 110 are shown in the table. The number of combinations of an input port and an output port is $N^2$ ways as mentioned previously. Further, because the deflection control amounts of the X axis and the Y axis for the input mirror 105 of the MEMS mirror array 101 and the output mirror 106 of the MEMS mirror array 102 are required for one pass, therefore, four pieces of deflection control amounts are necessary. As a consequence, in the instance of an optical switch having the number of input ports N and the number of output ports N, it is required to store $4N^2$ pieces of deflection control amounts. Therefore, in the conventional art, $4N^2$ pieces of deflection control amounts had to be stored into the memory 110, the memory capacity increased inevitably. Especially, in the instance when the scale of an optical switch becomes large in future owing to an increased number of input and output ports, because the necessary memory capacity increases by the square of the number of ports, the memory capacity will increase exponentially.

SUMMARY OF THE INVENTION

It is an object of the present invention to solve at least the above problems in the conventional technology.

The optical-switch testing apparatus according to one aspect of the present invention carries out a test on optical characteristics of an optical switch that deflects a light path for switching optical signals between an input port and an output port corresponding to an arbitrary pass. The optical-switch testing apparatus includes a light source that inputs an optical signal for the test to each of the input ports, a light detector that detects light receiving level of the optical signal output from each of the output ports, and a control unit that, whenever the optical signal is switched, changes a deflection status of the light path to obtain an optimal point at which the light receiving level is maximum, and calculates a parameter to optimize the deflection status based on the optimal point.

The optical-signal switching apparatus according to another aspect of the present invention includes an optical switch that switches optical signals of a plurality of channels forming a light transmission path to other arbitrary channels, a light detector that detects light receiving levels of optical signals output from each output port of the optical switch, a memory that stores optical offsets and structure parameters of tilt mirrors of a first mirror array and a second mirror array that constitute the optical switch, a deflection-control-amount calculating unit that calculates deflection control amounts for changing angles of the tilt mirrors of the first mirror array and the second mirror array based on the optical offsets and the structure parameters stored, a driving unit that supplies the deflection control amounts calculated to a first deflecting unit of the first mirror array and a second deflecting unit of the second mirror array to change the angles of the tilt mirrors, and a control unit that changes the deflection control amounts based on the deflection control amounts calculated and the light receiving level detected to obtain an optimal point at which the light receiving level is maximum.

The optical-switch testing method according to still another aspect of the present invention is for a test on optical characteristics of an optical switch that deflects a light path for switching optical signals between an input port and an output port corresponding to an arbitrary pass. The optical-switch testing method includes steps of inputting an optical signal for the test to the input port, detecting light receiving level of the optical signal output from the output port, changing a deflection status of the light path to obtain an optimal point at which the light receiving level is maximum, whenever the optical signal is switched, and calculating a parameter to optimize the deflection status based on the optimal point.

The method of controlling an optical-signal switching apparatus that switches optical signals of a plurality of channels forming a light transmission path to other arbitrary channels, according to still another aspect of the present invention, includes steps of detecting light receiving levels of optical signals output from each output port of the optical switch, calculating deflection control amounts for changing angles of tilt mirrors of a first mirror array and a second mirror array based on default optical offsets and structure parameters of the tilt mirrors, supplying the deflection control amounts calculated to a first deflecting unit of the first mirror array and a second deflecting unit of the second mirror array to change the angles of the tilt mirrors, and changing the deflection control amounts based on the deflection control amounts calculated and the light receiving level detected to obtain an optimal point at which the light receiving level is maximum.

The method of controlling an optical-signal switching apparatus that switches optical signals of a plurality of channels forming a light transmission path to other arbitrary channels including an optical switch that deflects a light path for switching optical signals between an input port and an output port corresponding to an arbitrary pass where the optical switch is mounted on the optical-signal switching apparatus after having optical characteristics tested, according to still another aspect of the present invention, includes steps of mounting the optical switch and a memory after a test of the optical characteristics, detecting light receiving level of the optical signals output from each of the output ports of the optical switch, calculating deflection control amounts changing angles of tilt mirrors of a first mirror array and a second mirror array based on optical offsets and structure parameters stored in the memory, supplying the deflection control amounts calculated to a first deflecting unit of the first mirror array and a second deflecting unit of the second mirror array to change the angles of the tilt mirrors, and changing the deflection control amounts based on the deflection control amounts calculated and the light receiving level detected to obtain an optimal point at which the light receiving level is maximum. The test of the optical characteristics of the optical switch includes steps of inputting an optical signal to the input port, detecting the light receiving level of the optical signal output from the output port, changing deflection status of the optical switch to obtain the optimal point, calculating the optical offsets and the structure parameters for optimizing the deflection status based on the optimal point, and storing the optical offsets and the structure parameters calculated in the memory.

The method of controlling an optical-signal switching apparatus that switches optical signals of a plurality of channels forming a light transmission path to other arbitrary channels including an optical switch that deflects a light path for switching optical signals between an input port and an output port corresponding to an arbitrary pass where the optical switch is mounted on the optical-signal switching apparatus after having optical characteristics tested, according to still another aspect of the present invention, includes steps of mounting the optical switch and a memory after a test of the optical characteristics, detecting light receiving level of the optical signals output from each of the output ports of the optical switch, supplying the deflection control amounts calculated to a first deflecting unit of the first mirror array and a second deflecting unit of the second mirror array to change the angles of the tilt mirrors, and changing the deflection control amounts based on the deflection control amounts calculated and the light receiving level detected to obtain an optimal point at which the light receiving level is maximum. The test of the optical characteristics of the optical switch includes steps of inputting an optical signal to the input port, detecting the light receiving level of the optical signal output from the output port, changing deflection status of the optical switch to obtain the optimal point, calculating the optical offsets and the structure parameters for optimizing the deflection status based on the optimal point, calculating deflection control amounts changing angles of tilt mirrors of a first mirror array and a second mirror array based on optical offsets and structure parameters stored in the memory, and storing the deflection control amounts calculated in the memory.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a table of data contents stored in a memory;

FIG. 7 is a plot for explaining number of parameters stored in the memory;

FIG. 9 is a table of data contents of a memory in the optical-signal switching apparatus;

FIG. 15 is a table of memory contents to store the deflection control amount.

DETAILED DESCRIPTION

Figure 1:
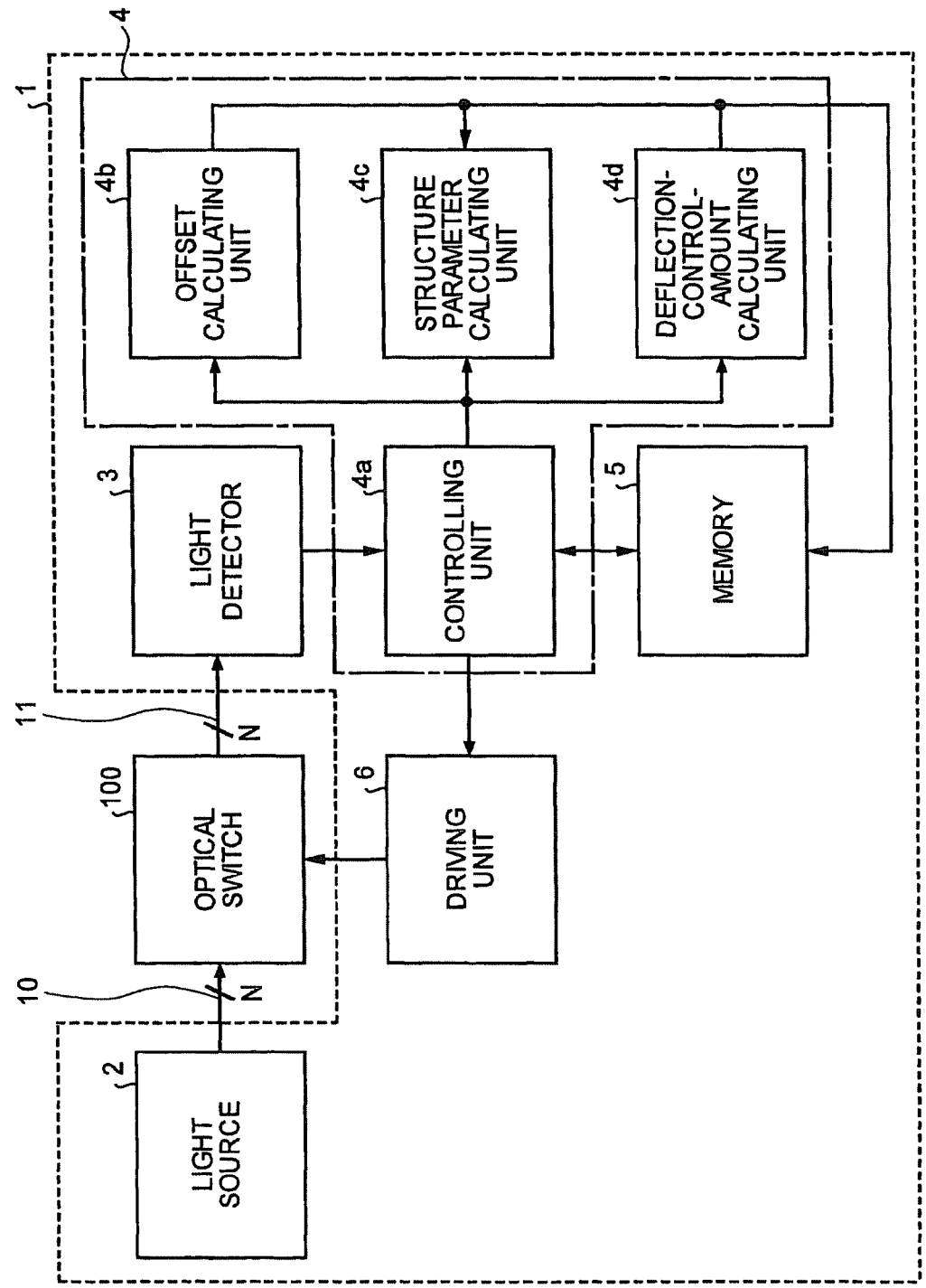
FIG. 1 is a block diagram of an optical-switch testing apparatus according to the present invention.

Exemplary embodiments of an optical-switch testing apparatus, an optical-signal switching apparatus, an optical-switch testing method, and a control method for optical-signal switching according to the present invention are explained in detail with reference to the accompanying drawings. FIG. 1 is a block diagram of an optical-switch testing apparatus according to the present invention. An optical switch 100 is tested in the status assembled in an optical-switch testing apparatus 1. This optical-switch testing apparatus 1 includes a light source 2, a light detector 3, a control section 4, a memory 5, and a driving unit 6.

A test signal output from the light source 2 is output via an optical fiber 10 to the optical switch 100. The optical switch 100 carries out the optical signal change mentioned above and outputs the test signal via an optical fiber 11 to the light detector 3. The optical switch 100 has N pieces of ports, and there are N pieces of the output ports of optical signal of the light source 2, and N pieces of the input ports of the light detector 3, respectively in the same manner. Likewise, there are N pieces of the optical fibers 10 and 11 respectively.

With regard to the N pieces of the optical fiber 10, one end of each thereof is connected to the light source 2, and the other end of each thereof is connected to each of the ports 103-1-103-N of the collimator array 103 at the input side of the optical switch 100. With regard to the N pieces of the optical fiber 11, one end of each thereof is connected to each of the ports 104-1-104-N of the collimator array 104 at the output side of the optical switch 100, and the other end of each thereof is connected to the light detector 3. Thereby, optical signals may be input from the light source 2 to all the ports of the optical switch 100, and optical signals output from all the ports of the optical switch 100 may be detected by the light detector 3.

The light detector 3, for example, includes a photo diode that detects electric signals corresponding to light signal levels (photo current; current signal), and a current/voltage converter that converts detected photo current into a voltage signal and outputs the voltage signal, and the like. The value that this light detector 3 detects (detection signal) is output to the control section 4.

The control section 4 controls the entire actions of the optical-switch testing apparatus 1 at the moment of a test to the optical switch 100. This control section 4 has a control section 4a, an offset calculating unit 4b, a structure parameter calculating unit 4c, and a deflection-control-amount calculating unit 4d. The control section 4a, at the moment of a test of the optical switch 100, on the basis of a detection signal input from the light detector 3, executes and controls calculations by use of the offset calculating unit 4b, the structure parameter calculating unit 4c, and the deflection-control-amount calculating unit 4d. The control section 4a outputs the deflection control amount obtained by the calculation to the driving unit 6, and stores the final test results obtained by the calculation to the memory 5.

In the memory 5, the combinations of an input port and an output port concerning all the ports of the optical switch 100 are listed in a table. In correspondence to each of all the combinations of the input and output ports, the deflection control amounts obtained by the calculation process of the control unit 5 are stored.

The respective units that configure the control section 4 may be structured by an application specific integrated circuit (ASIC) such as a field programmable gate array (FPGA).

The driving unit 6 converts the digital deflection control amounts output from the control section 4 into analog variables, and drives the optical switch 100. In concrete, the driving unit 6 outputs driving voltage (V) corresponding to the angle to be changed to the input mirror 105 of the MEMS mirror array 101, and the output mirror 106 of the MEMS mirror array 102 that the optical switch 100 has.

Figure 2:
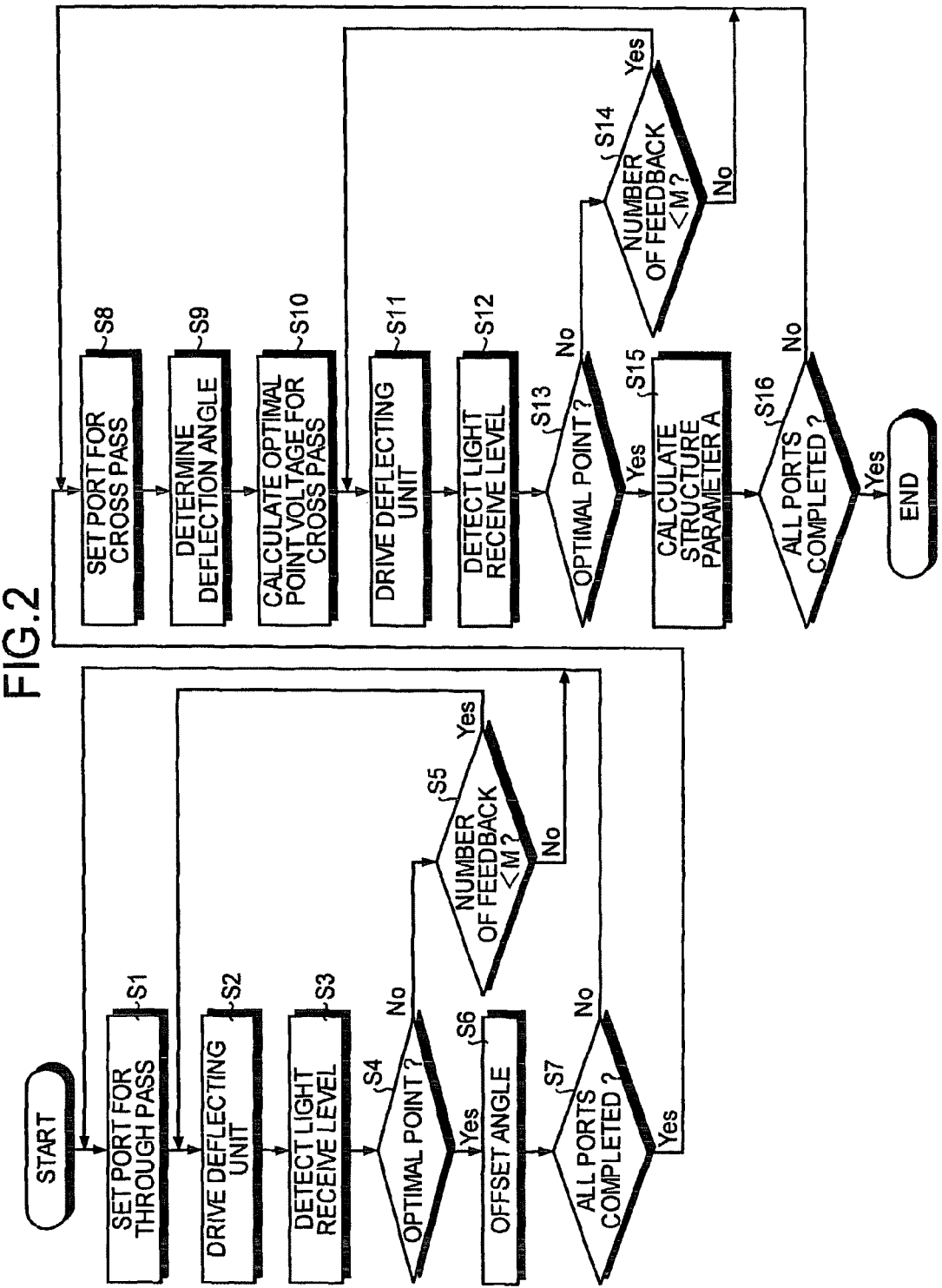
FIG. 2 is a flowchart of a test procedure for the optical-switch testing apparatus.

In the next place, the test contents of the optical switch 100 by the optical-switch testing apparatus 1 according to the present invention are explained hereinafter. The test of the optical switch 100 consists roughly of three calculation processes. These three are the calculation processes of [1] optical offsets, [2] deflection control amounts of a cross pass, and [3] structure parameters. The contents of the respective calculation processes are explained hereinafter. FIG. 2 is a flowchart of a test procedure for the optical-switch testing apparatus.

At the start of the test of the optical switch 100, all the data of the memory 5 shown in FIG. 1 are initialized by zero. Then the input port number is set to i, and the output port number is set to j, and a change instruction of through passes in which it stands that i=j is carried out (step S1). Thereby, the control section 4a accesses the memory 5, and gets port information corresponding to the change instruction and outputs the port information to the driving unit 6.

FIG. 3 is a table of data contents stored in a memory. The area of the memory 5, as shown in the figure, consists of an optical offset storage area 5a, an input mirror structure parameter storage area 5b, and an output mirror structure parameter storage area 5c. To the optical offset storage area 5a, optical offsets ($\theta_{off}$) in through passes where the input port number i (1 to N) coincide with the output port number j (1 to N) (i=j) are stored. To the input mirror structure parameter storage area 5b, input mirror structure parameters (A) of the input port numbers 1 to N of the input mirror 105 of the MEMS mirror array 101 at the input side are stored. To the output mirror structure parameter storage area 5c, output mirror structure parameters (A) of the output port numbers 1 to N of the output mirror 106 of the MEMS mirror array 102 at the output side are stored.

In the MEMS mirror arrays 101 and 102, in principle, at the moment of a through pass, when the deflection control amount (driving voltage) to be output to the driving unit 6 is zero, the light loss in the optical switch 100 becomes minimum. However, as mentioned previously, owing to displacement at assembly of the optical switch 100, the light loss will not actually become minimum.

Therefore, in the next place, the deflecting units (not shown) respectively arranged in the input mirror 105 corresponding to the input port number i, and the output mirror 106 corresponding to the output port number j in the MEMS mirror arrays 101 and 102 that configure the optical switch 100 are driven via the driving unit 6, and thereby the angles of the input mirror 105 and the output mirror 106 are adjusted (step S2).

Figure 4:
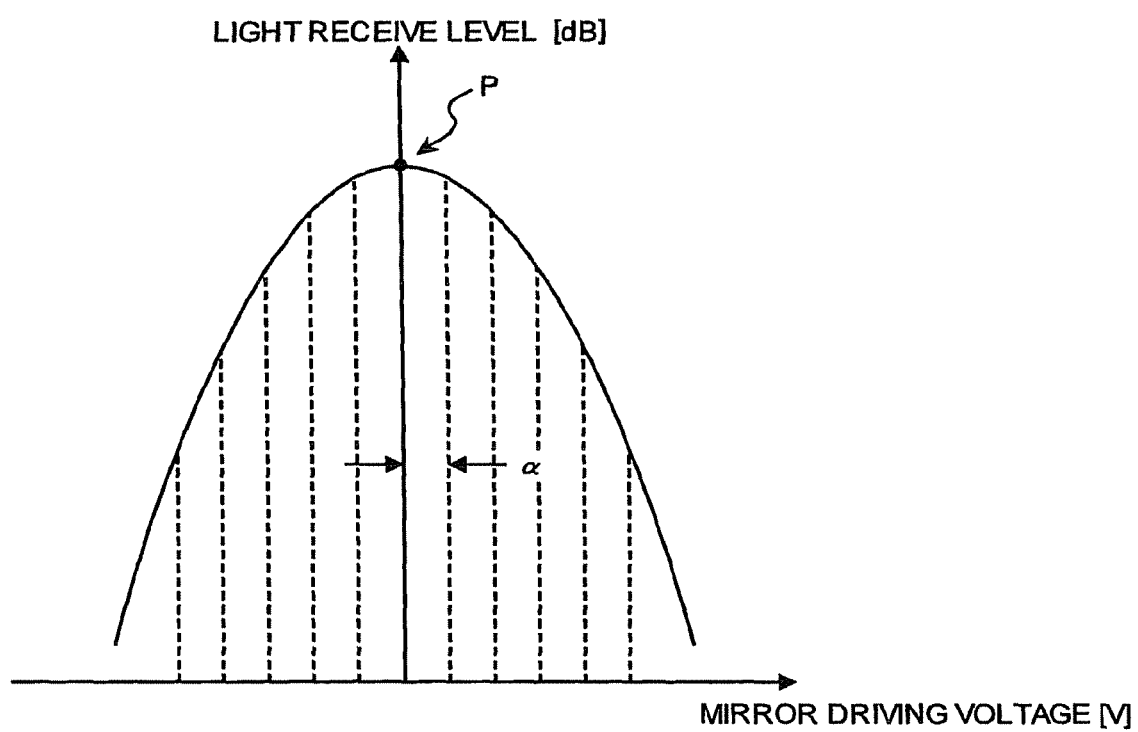
FIG. 4 is a plot of change of light loss when changing an angle.

FIG. 4 is a plot of change of light loss when changing an angle. The adjustment of the angles of the input mirror 105 and the output mirror 106 is carried out, as mentioned previously, by changing the driving voltage as the deflection control amount to the deflecting units. The figure explains that as the driving voltage to the deflecting units to the input mirror 105 and the output mirror 106 is changed continuously, the light receiving level of optical signals that the light detector 3 detects changes. The peak P at which the light receiving level is highest is the optimal point at which the light loss becomes minimum. While, the driving voltage is set so as to be changed by a voltage value α, but this voltage value α may be set arbitrarily.

The light receiving level of optical signal at this moment is detected by the light detector 3 (step S3), and it is judged whether the optimal point at which the light receiving level becomes highest has been obtained (step S4). The judgment of the optimal point is made by performing a feedback control in which the procedure goes back to the step S2 (step S4: No—step S2—step S3) for plural times. In one time of the feedback control, the light receiving level that is obtained when the driving voltage to the deflecting units is changed by only α is detected, and it is judged whether the light receiving level has become higher than that in the previous time.

In this feedback control, a control number of times M is specified (step S5). Therefore, the feedback control is carried out for a specified number of times, for the period until the control number of times M is reached (step S5: Yes). If the number of times of the feedback control becomes the control number of times M or more (step S5: No), there is a possibility that the angles of the input mirror 105 and the output mirror 106 as the change objectives may not have been changed normally, or there may be an error with the optical fibers of the corresponding port numbers i and j.

In this instance, the procedure goes back to the step S1, and it is judged that it is not possible to obtain the optimal point in the corresponding port numbers i and j, and a change instruction to the next combination of ports to be tested is made. By the way, at this moment, the optical-switch testing apparatus 1 may write specified values representing "test impossible" or "use impossible" to a corresponding storage area of the memory 5, or may make a list of ports to which test is impossible.

When the optimal point is obtained (step S4: Yes), the deflection control amount that has been changed by the feedback control is converted into an offset angle by the offset calculating unit 4b (step S6), and is accumulated in the optical offset storage area 5a of the input and output ports that have become the objectives of the change instruction in the memory 5. The calculation of the optical offset by the offset calculating unit 4b is based on the following equation (1), and the deflection angle θ of the deflecting units at the moment when the optimal point mentioned above is obtained is made as the optical offset $$\theta = AV^2 \qquad (1)$$

where θ is deflection angle of deflecting unit, A is structure parameter of deflecting unit, and V is deflection control amount (driving voltage) that driving unit outputs.

On the basis of the relation expressed in the equation (1), the optical offset is calculated. In this step to calculate the optical offset, a representative value is used as the structure parameter A. However, as described later herein, a process to calculate the structure parameter A precisely and to update the data is added later.

Then, it is judged whether the calculation of the optical offsets to all the combinations of input ports concerning through passes has been completed (step S7). When the calculation of the optical offsets to all through passes has not been completed (step S7: No), the procedure goes back to the step S1. Thereafter, when all the ports of the respective output ports corresponding to a through pass have been measured (step S7: Yes), the calculation of the optical offsets concerning all the combinations of the port numbers i and j is completed.

After completion of the calculation of the optical offsets concerning all through passes in which when the number of the input port is defined as i, and the number of the output port is defined as j, it stands that i=j, the deflection control amounts of cross passes is calculated. In cross passes, a change instruction of cross passes in which it stands that i≠j is carried out (step S8). Thereby, the control section 4a accesses the memory 5, and gets port information corresponding to the change instruction and outputs the port information to the driving unit 6.

Figure 5:
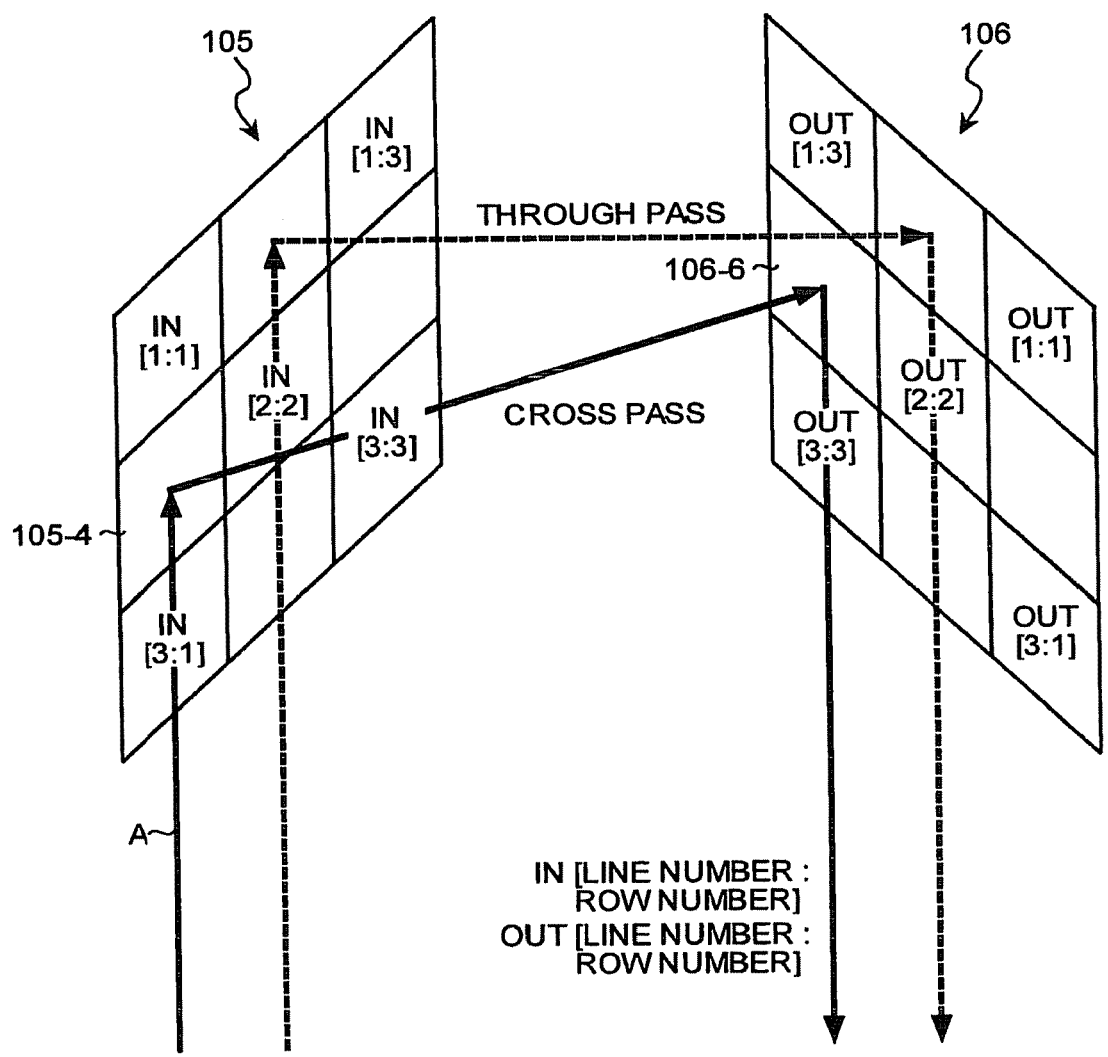
FIG. 5 is a schematic for illustrating a light path in a cross pass.

FIG. 5 is a schematic for illustrating a light path in a cross pass. For convenience of explanation, the numbers of the input mirrors 105 and the output mirrors 106 arranged in the MEMS mirror arrays 101 and 102 are shown fewer than actual ones. In addition, to each of the input mirrors 105 and the output mirrors 106, a line and a row [line number:row number] are added therein. This cross pass shows an example with the input port number i=4 and the output port number j=6. The light path A in a cross pass, as shown in the figure, changes the angles of the input mirrors 105 and the output mirrors 106.

At this moment, the deflection angles of the input mirror 105-4 and the output mirror 106-6 to become the objectives of the change instruction are determined respectively in reference to the optical offsets (step S9). The deflection-control-amount calculating unit 4d reads the optical offset information that has been measured in the step S6 from the memory 5, and calculates the deflection control variables of cross passes (driving voltage most suitable for cross passes) (step S10).

The deflection control amounts of cross passes in which it stands that i≠j are calculated on the basis of the following equation $$V=\sqrt{((\theta+\theta_{off})/A)} \quad (2)$$

where $\theta_{off}$ is optical offset.

In the equation (2), optical offset is included, therefore, in comparison with the instance where optical offset is not taken into consideration, the deflection control amount V may be calculated in higher precise manners.

In the next place, the deflection control amounts corresponding to the input port and the output port that have received the change instruction are stored in a storage unit (not shown), and the driving unit 6 is executed so that the deflection control amounts should be attained, thereby, the changing units of the input mirror 105-4 and the output mirror 106-6 to be the objectives of the change instruction are driven, and the deflection angles are changed (step S11). Thereby, the light path A of light as shown in FIG. 5 is formed. At this moment, the light receiving level of the optical signal that is output from the port 6 (104-6) of the collimator array 104 corresponding to the output port number j=6 is detected by the light detector 3 (step S12).

Then, it is judged whether the optimal point at which the light receiving level of the optical signal at this moment becomes highest has been obtained (step S13). The judgment of the optimal point is made by performing a feedback control in which the procedure goes back to the step S11 (step S13: No—step S11—step S12) for plural times. In the same manner as in through passes, in one time of the feedback control, the light receiving level that is obtained when the driving voltage to the deflecting units is changed by only α is detected, and it is judged whether the light receiving level has become higher than that in the previous time.

In this feedback control, a control number of times N is specified (step S14). Therefore, the feedback control is carried out for a specified number of times, for the period until the control number of times N is reached (step S14: Yes). If the number of times of the feedback control becomes the control number of times N or more (step S14: No), there is a possibility that the angles of the input mirror 105-4 and the output mirror 106-6 as the change objectives may not have been changed correctly, or there may be an error with the optical fibers of the corresponding port numbers i=4 and j=6.

In this situation, the procedure goes back to the step S8, and it is judged that it is not possible to obtain the optimal point in the corresponding port numbers i=4 and j=6, and a change instruction to the next combination of ports to be tested is made. By the way, at this moment, the optical-switch testing apparatus 1 may write specified values representing "test impossible" or "use impossible" to corresponding storage area of the memory 5, or may make a list of ports to which test is impossible.

When the optimal point is obtained (step S13: Yes), the procedure goes to the calculation process of the structure parameters. Herein, the deflection angle of the deflecting unit at the moment when the optimal point is obtained is explained hereinafter. For example, when the deflection angle of the deflecting unit that is necessary in the situation where the positions of the input and output mirrors to be used is displaced by one line in the line and row [line number n:row number m] is defined as Δx, as shown in FIG. 5, in order to connect the cross pass by use of mirrors with a difference only N in IN [n:m] and OUT [n+N:m], from the equation (1), a deflection control amount VN as shown in the following equation is required $$\Delta x \times N = A \times V_N^2 \quad (3)$$

In the same manner, in the instance of a difference of (N+1) lines, like IN [n:m] and OUT [n+(N+1):m], a deflection control amount $V_{N+1}$ as shown in the following equation is required $$\Delta x \times (N+1) = A \times V_{N+1}^2 \quad (4)$$

Figure 13:
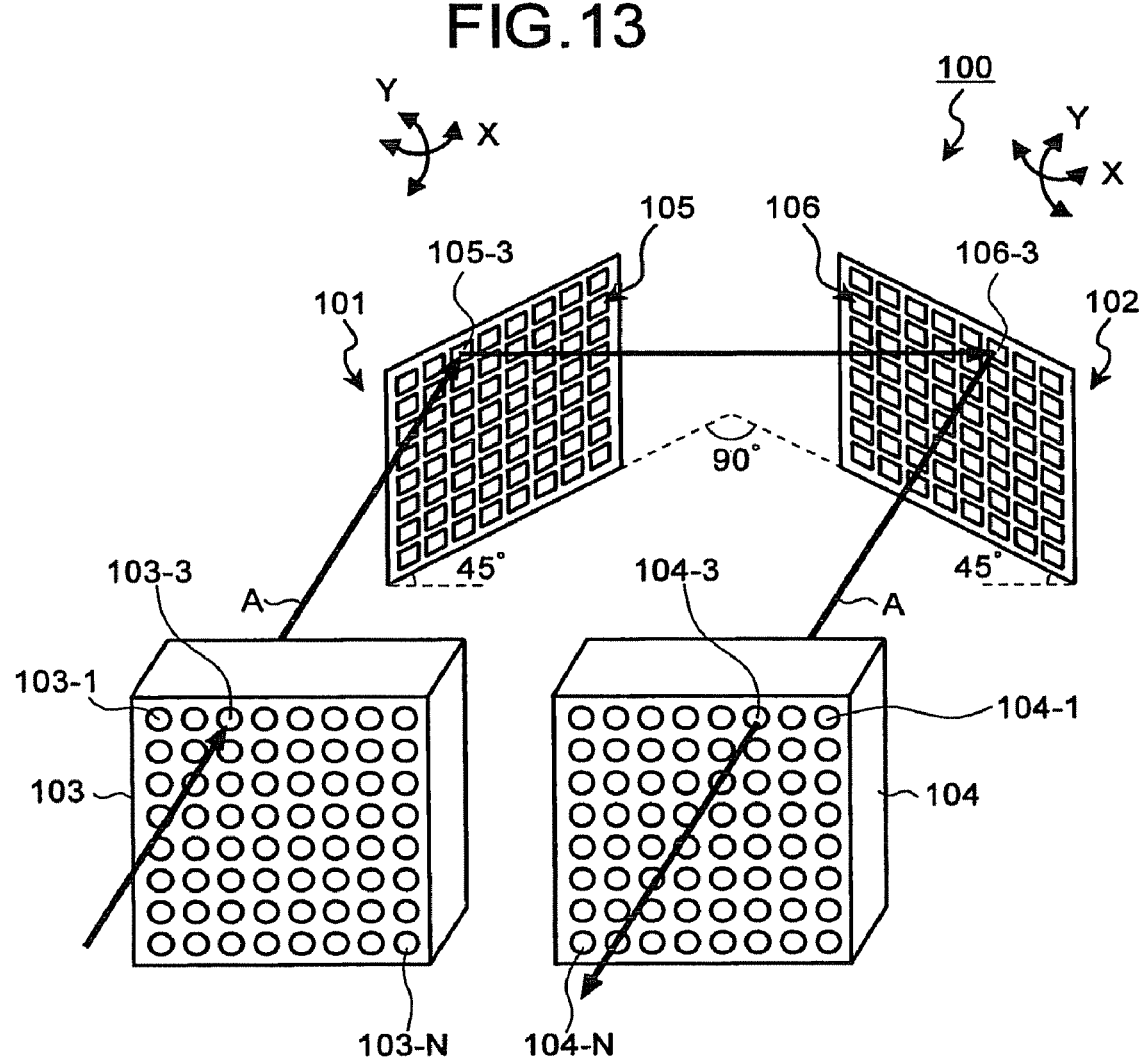
FIG. 13 is a perspective view of an optical switch.
Figure 14:
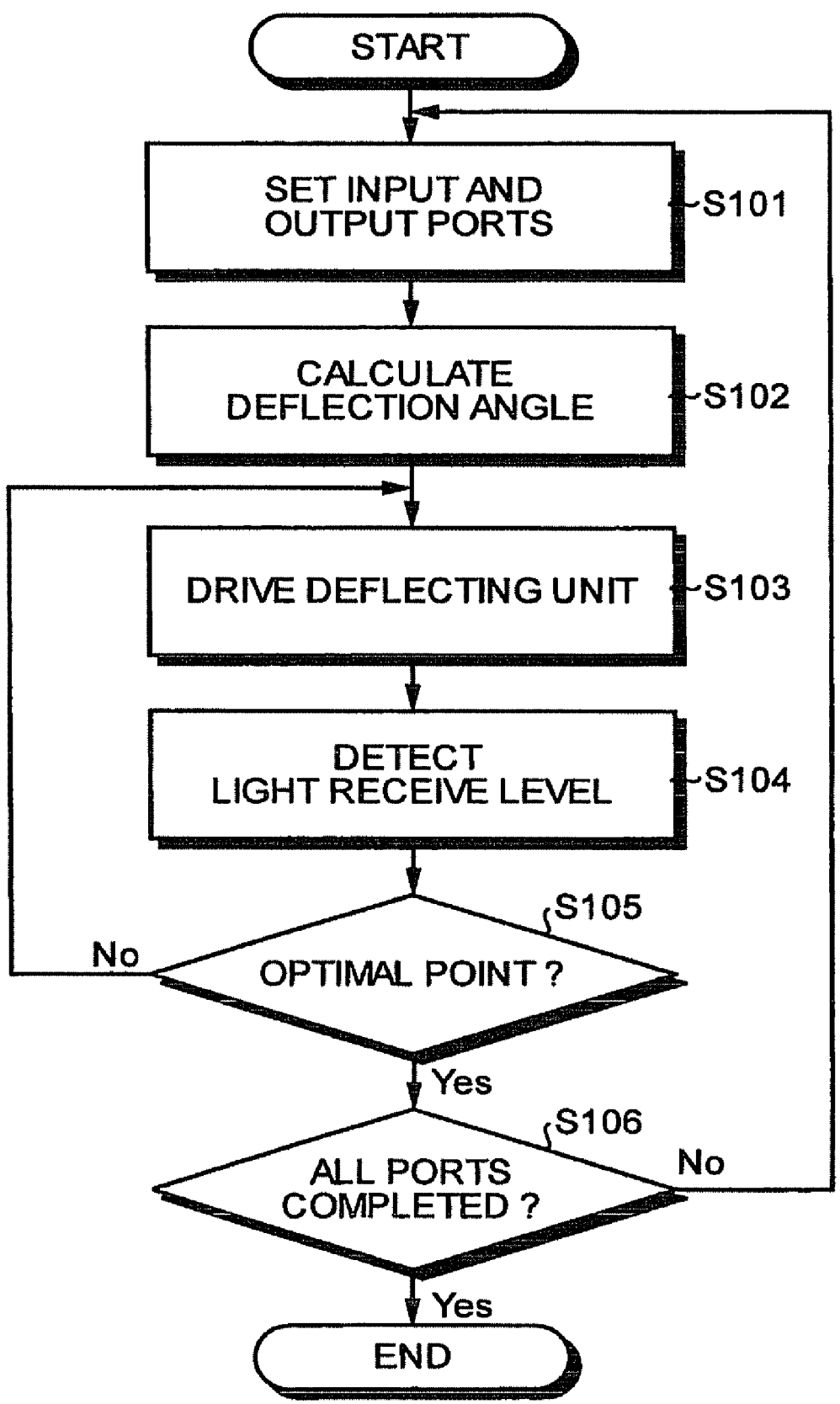
FIG. 14 is a flowchart of a test procedure for obtaining a deflection control amount of an optical switch according to a conventional technology.

Through the process mentioned above, among the input mirror 105 of the MEMS mirror array 101 at the input side, and the output mirror 106 of the MEMS mirror array 102 at the output side, shown in FIG. 13 and FIG. 5, as for the input mirror 105 and the output mirror 106 in which the test concerning cross pass change has been carried out normally, changes of input ports and output ports have been completed in equal to or more than two routes.

With regard to the input mirror 105 and the output mirror 106, in the next place, a structure parameter A of mirror is calculated (step S15). The structure parameter calculating unit 4c reads the deflection angle and the deflection control amount from corresponding areas of the storage unit, and calculates the structure parameter A. The structure parameter A may be obtained, on the basis of the equations (3) and (4), and by use of the following equation (5)

$$\Delta x = A(V_{N+1}^2 - V_N^2)$$

$$\therefore A = \Delta x / (V_{N+1}^2 - V_N^2) \quad (5)$$

The value of the structure parameter A is calculated with regard to the input mirror 0105 and the output mirror 106, and is stored into the storage area 5b of the structure parameters of the input mirror, and the storage area 5c of the structure parameters of the output mirror of the memory 5, respectively.

Figure 6A:
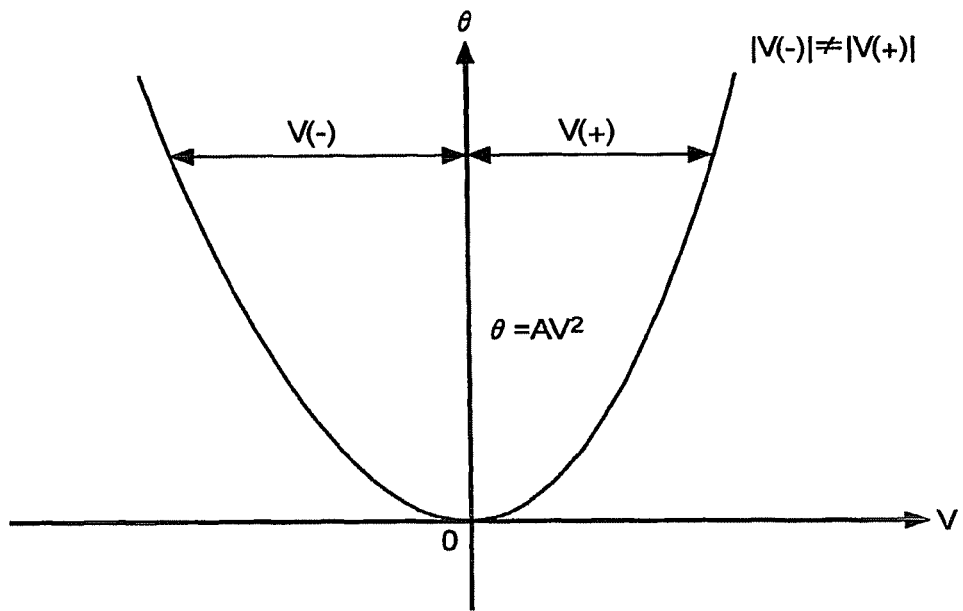
FIG. 6A and FIG. 6B are plots for illustrating a fluctuation in a deflection angle with respect to the deflection control amount.
Figure 6B:
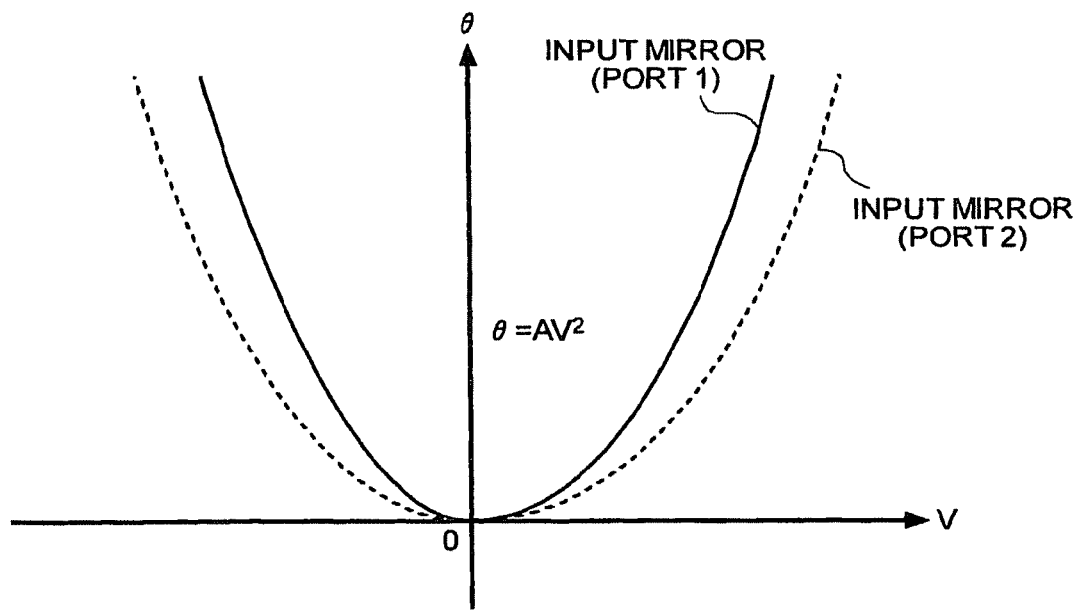

FIG. 6A and FIG. 6B are plots for illustrating a fluctuation in a deflection angle with respect to the deflection control amount. In the input mirror 105 and the output mirror 106, the deflection angle to the deflection control amount (driving voltage) has a characteristic curve shown by a quadratic function. This figure explains only one axis of the two axes directions in which the mirror can change the angles thereof. Since there is fluctuation in the structure parameter A, the input mirror 105 and the output mirror 106 may show mutually different characteristic curves, as shown in FIG. 6B. In this figure, examples of the characteristic curves of mutually different port numbers 1 and 2 of the input mirror 105 are shown.

These input mirror 105 and the output mirror 106, with the moment of non drive when the driving voltage is 0 as a center, supply driving voltage with plus (+) deflection angle at the moment of angle change to one direction, and supply driving voltage with minus (−) driving voltage at the moment of angle change to the other direction. However, the input mirror 105 and the output mirror 106, as shown in the figure, may have an asymmetrical curve in the left and the right (plus and minus) with driving voltage zero as the center. When the structure parameter A is calculated with a precondition of a symmetrical characteristic curve, to such an input mirror 105 and output mirror 106, there will be an error in the calculated value of the deflection control amount.

Therefore, at the moment of a cross pass connection, at every time of calculation of the deflection control amount of the third route and after, the structure parameter A of the memory 5 obtained by the equation (5) is read and used. The structure parameter A of the input mirror 105 and the output mirror 106 may be calculated with regard to a mirror with which arbitrary two routes have been established, therefore, by repeating calculations on respective input mirror 105 and output mirror 106 in which routes have been established, it is possible to improve the precision of the structure parameter A.

In the explanation mentioned above, as shown in the equations (3) and (4), the structure parameter A corresponding to displacement in the line direction among the line and the row of the input mirror 105 is calculated. By the same calculation, with regard to the row direction of the input mirror 105, the line direction and the row direction of the output mirror 106, the structure parameter A may be made highly precise.

Then, it is judged whether the calculation of the deflection angles and the structure parameters to all the combinations of input and output ports concerning a cross pass has been completed (step S16). When the calculation of the deflection angles and the structure parameters concerning the cross pass has not been completed (step S16: No), the procedure goes back to the step S8. Thereafter, when all the ports of the respective output ports corresponding to the cross pass have been measured (step S16: Yes), the calculation of the deflection angles and the structure parameters concerning all the combinations of the port numbers i and j is completed.

As explained above, when to test the deflection control amount of the optical switch 100, it is possible to calculate deflection control amounts in which characteristic fluctuation that the deflecting units of the MEMS mirror 101 and 102 have is compensated. Especially, because the optical offsets that the deflection units have at the moment of a through pass are calculated, and the deflection control amounts in all the cross passes are obtained by use of the optical offsets, it is possible to improve the precision of the deflection control amounts, also to shorten a test time.

For the calculation of the deflection control amount, respective information chips of an input port and an output port corresponding thereto, optical offset $\theta_{off}$, and structure parameter A are required. The information on the input port and the output port that carries out changes is determined by the positional relation of the input port and the output port.

As shown in FIG. 3, when the number of input ports is N and the number of output ports is N, the data amount of the optical offset $\theta_{off}$ becomes 4N pieces in total, for N ways in which the input port number i coincides with the output port number j (i=j) at a through pass, and respectively with the X axis and the Y axis of the input mirror 105 and the X axis and the Y axis of the output mirror 106. While, the data amount of the structure parameter A becomes 4N pieces in total, for the number of input ports N of the input mirror 105, and respectively with the four axes. In the same manner, with regard to the output mirror 106, the data amount of the structure parameter A becomes 4N pieces in total, for the number of output ports N, and respectively with the four axes. Thereby, to the memory 5, 12N pieces of parameters in total are stored for these optical offset $\theta_{off}$ and structure parameter A. The deflection control amount is obtained by the calculation by the control section 4a, on the basis of these optical offset $\theta_{off}$ and structure parameter A.

Especially, as the number of the input and output ports of the optical switch 100 increases, the number of the deflection control amounts to be stored in the memory 5 increases accordingly. However, according to the present invention, by optimizing the data contents to be stored in the memory 5, it becomes possible to calculate the deflection control amounts.

Namely, the deflection control amount at the moment when a change instruction to set input and output ports is received may be calculated by the equation (2), and the deflection angles of the deflecting units are determined by the positions of an input port and an output port. Therefore, only by use of the memory 5 having the 12N pieces in total of storage areas mentioned above, deflection control amounts may be calculated on the basis of the respective equations (2)-(5) mentioned above. Especially, as shown in FIG. 3, there is no need to memorize parameters concerning all the combinations of input ports and output ports, only the optical offset concerning N ways in which the input port number i coincides with the output port number j (i=j) corresponding to a through pass, the structure parameter A concerning N pieces of the input port i (input mirror 105), and the structure parameter concerning N pieces of the output port j (output mirror 106) may be memorized for the purpose.

FIG. 7 is a plot for explaining number of parameters stored in the memory. According to the method following the procedures under the present invention, only 12N pieces of parameters are required. In contrast, the number of parameters according to the conventional art becomes $4N^2$ pieces as explained in reference to FIG. 15. Thereby, according to the method of the present invention, so long as the number of input and output ports is equal to or more than three, it is possible to reduce the memory capacity of the memory 5 in comparison with the conventional art, and the more the number of ports increases, the more significant the difference appears. For example, when the number of ports is 100, according to the method of the present invention, it is possible to reduce the memory amount equal to or more than ten times in comparison with the conventional method.

Further, according to the test method mentioned above, the calculation of the optical offsets is carried out only with each input and output port corresponding to a through pass, and at a cross pass, the structure parameter is calculated by use of this optical offset, therefore, it is possible to make the test time of deflection control amounts in around one (minute) per pass, consequently, it is possible to shorten the test time per pass to 1/5 of the conventional art.

The optical-switch testing apparatus 1 mentioned heretofore is so structured that the N pieces of input and output ports that the optical switch 100 has are individually connected to the light source 2 and the light detector 3 via optical fibers 10 and 11. However, the present invention is not limited to this, but an optical changeover device (not shown) may be arranged between the light source 2 and the optical switch 100, and between the optical switch 100 and the light detector 3. The light output from the light source 2 is output from a single optical fiber 10 via the optical changeover device selectively to the input port under testing. In the same manner, the light of the output port under testing of the optical switch 100 is taken out selectively via the optical changeover device and is output via a single optical fiber 11 to the light detector 3. According to this structure, there is no need to arrange the number of light receive element arrays corresponding to the number of ports N of the optical switch 100 in the light detector 3, and the light detector may be structured by only a single piece of light receive element.

Figure 8:
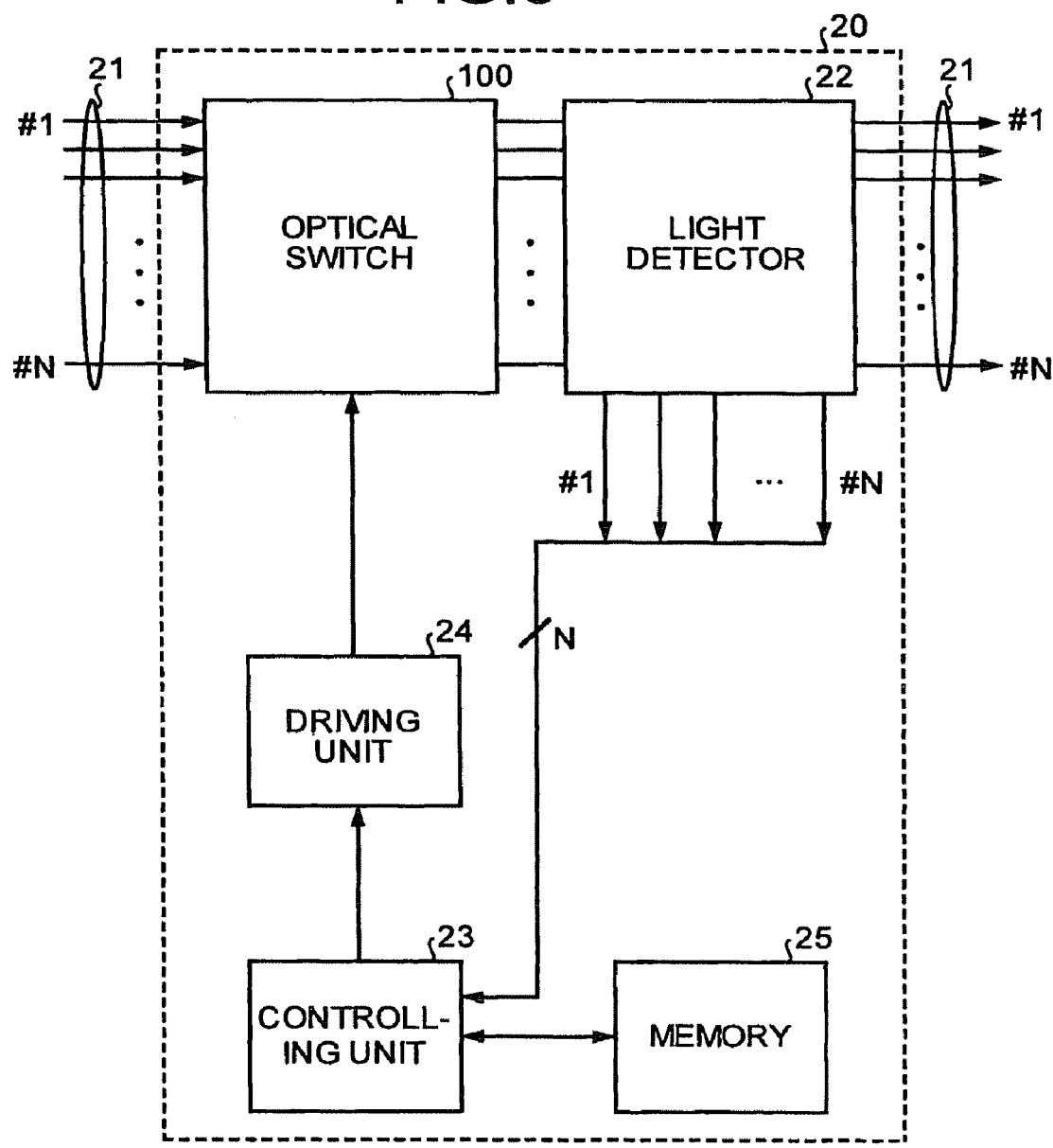
FIG. 8 is a block diagram of an optical-signal switching apparatus according to the present invention.

FIG. 8 is a block diagram of an optical-signal switching apparatus according to the present invention. Into this optical-signal switching apparatus 20, the optical switch 100 that has passed the test by the optical-switch testing apparatus 1 mentioned above is assembled.

This optical-signal switching apparatus 20 is arranged with the optical switch 100 portion inserted on the path of a light transmission path 21. The light transmission path 21 consists of N pieces of optical fibers, and different channels are allotted to the respective optical fibers. The optical switch 100 is the switch that carries out the light path change mentioned previously, to the N pieces of channels of the light transmission path 21, and transmits optical signals to the same channels at a through pass, while at a cross pass, the optical switch outputs optical signals from a channel that is different from the channel to which the optical signals were input. By the way, this "channel" has the same meaning as the "port" used in the optical switch 100.

The optical-signal switching apparatus 20 is equipped with a light detector 22, a control section 23, a driving unit 24, and a memory 25. The light detector 22 is arranged at the later stage position of the optical switch 100 on the light transmission path 21. This light detector 22 is configured by a monitor PD array, and detects optical signals of the system N after passing the optical switch 100 on the light transmission path 21 individually. The light detector 22 outputs most of optical signals on the light transmission path 21, for example, 95% of the input optical signal intensity onto the light transmission path 21, and outputs the remaining 5% separately to a light receive element such as a photodiode (PD). The PD outputs an electric signal (photo current; current signal) according to the level of each output optical signal, and a current/voltage converter (not shown) converts the electric signal of the PD into a voltage signal and outputs the voltage signal to the control section 23. By the way, the light detector 22 detects the light receiving level of optical signals of the N pieces of systems of the light transmission path 21 individually, and outputs a detection signal to the control section 23. The control section 23 has N pieces of ports, and scans the detection signals that are input to the N pieces of ports in time sharing manners and takes them in.

FIG. 9 is a table of data contents of a memory in the optical-signal switching apparatus. Into the memory 25, deflection control amounts respectively corresponding to all the combinations of the input port numbers and the output port numbers of the optical switch 100, which are obtained by the test of the optical-switch testing apparatus 1 are stored.

The optical-switch testing apparatus 1 may calculate deflection control amounts (driving voltage V) on the basis of the optical offset $\theta_{off}$ and the structure parameter A, and the deflection control amounts may be stored into the memory 5 mentioned previously, and this memory 5 may be attached to the optical-signal switching apparatus 20. The present invention is not limited to this, but deflection control amounts may be written into an empty memory 25 to which data has been transferred from an external device such as the optical-switch testing apparatus 1 and a writing unit (not shown) has been attached.

The control section 23 is configured by, for example, an ASIC such as an FPGA. This control section 23 drives and controls the optical switch 100 to change optical signals on the light transmission path 21. At the moment of channel change, the control unit reads deflection control amount of the input mirror 105 and the output mirror 106 (see FIG. 13) corresponding to the input and output ports from the memory 25, and outputs the deflection control amount via the driving unit 24 to the optical switch 100.

This deflection control amount is the variable that has been obtained through an actual test of the optical switch 100 by the optical-switch testing apparatus 1, therefore, only buy use of this deflection control amount, it is possible to make the light loss minimum to all the channels. However, when the optical-signal switching apparatus 20 is put into a practical use, owing to changes in environmental temperatures around the optical switch 100 and so forth, even with a same deflection control amount, the deflection angles of the input mirror 105 and the output mirror 106 are different at the test of the optical switch 100, and at an operation by the optical-signal switching apparatus 20, as a result, a specified light loss will occur. In order to cope with this, the control section 23 executes a stabilization control of optical output level after change of optical signals. In concrete, the control unit scans all the ports of the optical switch 100 and monitors light receiving level of optical signals. In addition, in order to keep the light loss of the optical switch 100 at minimum, the control unit performs a feedback control in which a specified deflection control amount is output to the driving unit 24. The details of this feedback control is to be described later herein.

The driving unit 24, receiving the deflection control amount output from the control section 23, converts the deflection control amount into driving voltage V as an analog controlled variable, and drives a deflecting unit (not shown) of the optical switch 100. In correspondence to this driving voltage V, the angles of the input mirror 105 of the MEMS mirror array 101, and the output mirror 106 of the MEMS mirror array 102, that configure the optical switch 100, are changed in two axis directions.

In the next place, the stabilization control of optical output level by the optical-signal switching apparatus 20 is explained hereinafter. At an operation of the light transmission path 21, the control section 23 of the optical-signal switching apparatus 20 monitors the light receiving level of optical signals of all the output ports that the optical switch 100 has. At the moment of this operation, between each input port and output port that the optical switch 100 has, the light path A of a through pass or a cross pass (See FIG. 5) is formed.

Now suppose that to the memory 25, with regard to the deflection control amount of the input mirror 105 and the output mirror 106 corresponding to a through pass, only the offset amount has been stored, while with regard to the deflection control amount of the input mirror 105 and the output mirror 106 corresponding to a cross pass, a specified value has been stored. The control section 23 reads the deflection control amounts of the input mirror 105 and the output mirror 106 corresponding to the through pass or the cross pass and outputs them to the driving unit 24. The driving unit 24 supplies the driving voltage V corresponding to the deflection control amounts to the deflecting units of the input mirror 105 and output mirror 106. The deflecting units change the angles of the input mirror 105 and output mirror 106 so as to form the light path A of the set cross pass.

Figure 10:
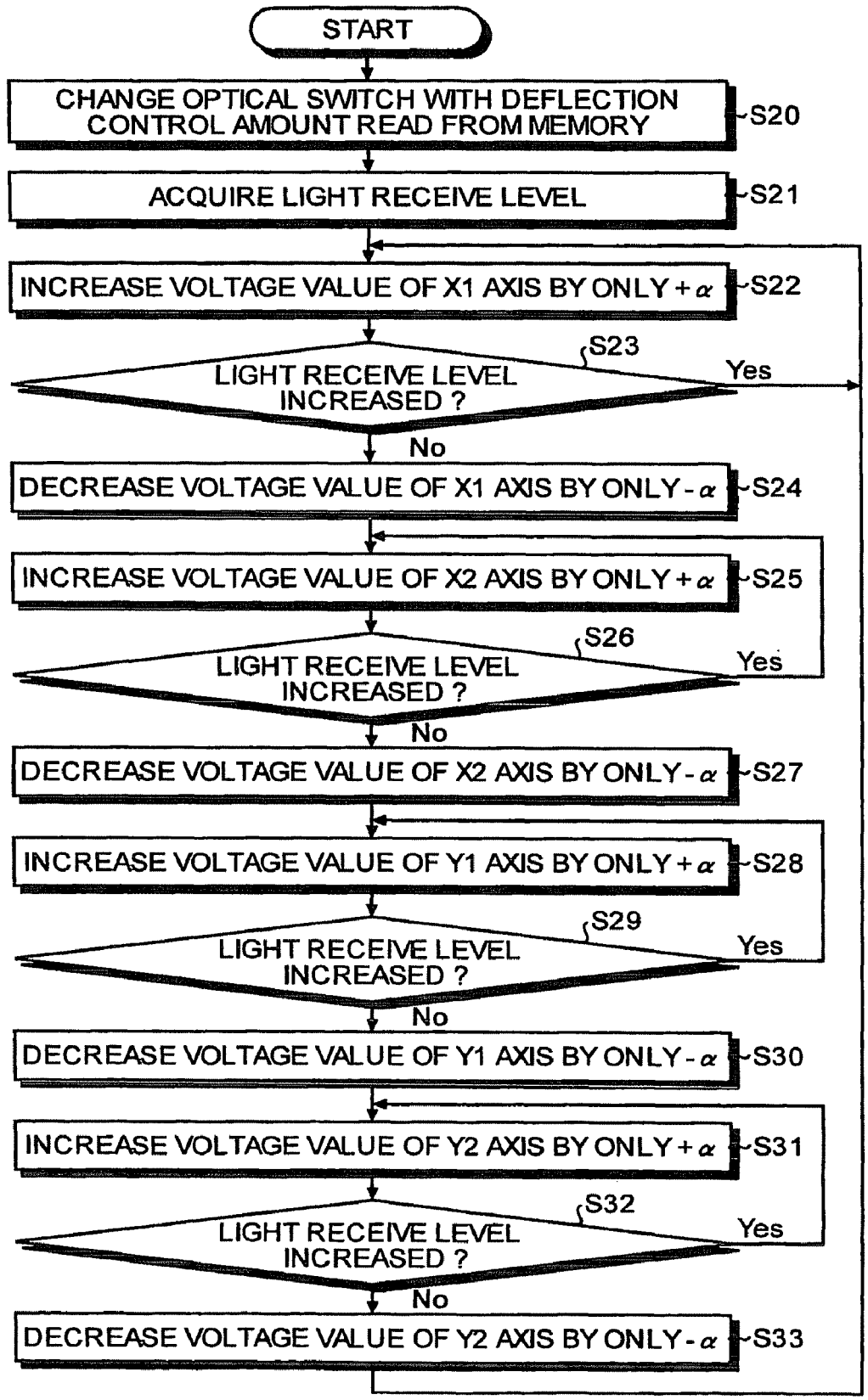
FIG. 10 is a flowchart of a control procedure for stabilizing light output level by the optical-signal switching apparatus.

As mentioned above, the optical-signal switching apparatus 20 is operated in a status where optical signals of the light transmission path 21 may be changed to other channels by change of the optical switch 100. FIG. 10 is a flowchart of a control procedure for stabilizing light output level by the optical-signal switching apparatus. The stabilization control of the light output level to a certain light path A at an operation is described. At this moment, a certain pass is either a through pass or a cross pass, while whether a through pass or a cross pass, the following stabilization control is performed.

In the first place, the control section 23 reads the deflection control amount from the memory 25, and supplies the deflection control amount to the driving unit 24, and carries out the change of the optical switch 100 (step S20). The driving unit 24 converts the deflection control amount into driving voltage V, and supplies the driving voltage to the deflecting units of the corresponding input mirror 105 and output mirror 106 respectively. The deflection control amount at this moment is the one that has been calculated on the basis of result of the test by the optical-switch testing apparatus 1, therefore, theoretically, it is the optimal point at which the light loss is minimum. However, in the optical-signal switching apparatus 20, the optical switch 100, the control section 23, and the driving unit 24 and the likes thereof are affected by changes in environment temperature and so forth of the device. Therefore, there may be an instance where the optimal point of light loss cannot be obtained by the control with the deflection control amount read from the memory 25.

Therefore, the control section 23 acquires the light receiving level of the optical signal of the output port corresponding to this pass from the light detector (step S21). Thereafter, the control unit performs a process to change the angle of the input mirror 105 and the output mirror 106 and thereby acquire the light receiving level of the optical signal. At this moment, with the deflection control amount read from the memory 25 as a standard, the control unit increases and decreases the deflection control amount, and changes the angle of the input mirror 105 and the output mirror 106 with the present angle as a standard. Herein, since the angle of the input mirror 105 and the output mirror 106 may be changed in two axis directions, explanation hereinafter is made with the X axis of the input mirror 105 as X1 axis, with the Y axis thereof as Y1 axis, while, with the X axis of the output mirror 106 as X2 axis, and the Y axis thereof as Y2 axis.

In the first place, the driving voltage V for driving the X1 axis that is supplied to the deflecting unit of the input mirror 105 is increased by only a voltage value α to the present voltage (+α) (step S22). Then, it is judged whether the light receiving level of the optical signal has increased at the moment (step S23). The increase direction of this voltage is the plus direction of the driving voltage V shown in FIG. 4. When the light receiving level of the present optical signal has increased (step S23: Yes), the procedure goes back to the step S22, where increasing the voltage value by only α is repeated. Thereby, the peak P of the light receiving level of the optical signal is obtained. By the way, after the peak P has been detected, if the driving voltage V is increased, the light receiving level starts declining.

Therefore, after the light receiving level increases, when it remains same or decreases (step S23: No), the driving voltage V of the X1 axis is decreased only by the voltage value α of one time increase (−α) (step S24). The increase direction of this voltage is the minus direction of the driving voltage V shown in FIG. 4. Thereby, the optimal point at which the light receiving level of the X1 axis of the input mirror 105 is highest, and light loss is little, is obtained.

In the next place, the driving voltage V for driving the X2 axis that is supplied to the deflecting unit of the output mirror 106 is increased only by a voltage value α to the present voltage (+α) (step S25). Then, it is judged whether the light receiving level of the optical signal has increased at the moment (step S26). When the light receiving level of the present optical signal has increased (step S26: Yes), the procedure goes back to the step S25, where increasing the voltage value only by α is repeated.

In this manner, after the light receiving level increases, when it remains same or decreases (step S26: No), the driving voltage V of the X2 axis is decreased only by the voltage value α of one time increase (−α) (step S27). Thereby, the optimal point at which the light receiving level of the X2 axis of the output mirror 106 is highest, and light loss is little, is obtained.

In the next place, the driving voltage V for driving the Y1 axis that is supplied to the deflecting unit of the input mirror 105 is increased only by a voltage value α to the present voltage (+α) (step S28). Then, it is judged whether the light receiving level of the optical signal has increased at the moment (step S29). When the light receiving level of the present optical signal has increased (step S29: Yes), the procedure goes back to the step S28, where increasing the voltage value only by α is repeated.

In this manner, after the light receiving level increases, when it remains same or decreases (step S29: No), the driving voltage V of the Y1 axis is decreased only by the voltage value α of one time increase (−α) (step S30). Thereby, the optimal point at which the light receiving level of the Y1 axis of the input mirror 105 is highest, and light loss is little, is obtained.

In the next place, the driving voltage V for driving the Y2 axis that is supplied to the deflecting unit of the output mirror 106 is increased only by a voltage value α to the present voltage (+α) (step S31). Then, it is judged whether the light receiving level of the optical signal has increased at the moment (step S32). When the light receiving level of the present optical signal has increased (step S32: Yes), the procedure goes back to the step S31, where increasing the voltage value only by α is repeated.

In this manner, after the light receiving level increases, when it remains same or decreases (step S32: No), the driving voltage V of the Y2 axis is decreased only by the voltage value α of one time increase (−α) (step S33). Thereby, the optimal point at which the light receiving level of the Y2 axis of the output mirror 106 is highest, and light loss is little, is obtained. Thereafter, the procedure goes back to the step S22, and the respective processes described above are executed again repeatedly.

According to the stabilization control of the light output level explained above, it is possible to sequentially obtain the optimal point of each of the X1 axis and Y1 axis of the input mirror 105, and the X2 axis and the Y2 axis of the output mirror 106. As mentioned above, by changing the angles of the input mirror 105 and the output mirror 106 corresponding to the ports whose channels have been changed by the optical switch 100 in two axis directions and detecting the light receiving level, even if environment temperature and so forth of the optical-signal switching apparatus 20 change, it is possible to always reduce the light loss of optical signals of the changed channels.

Figure 11:
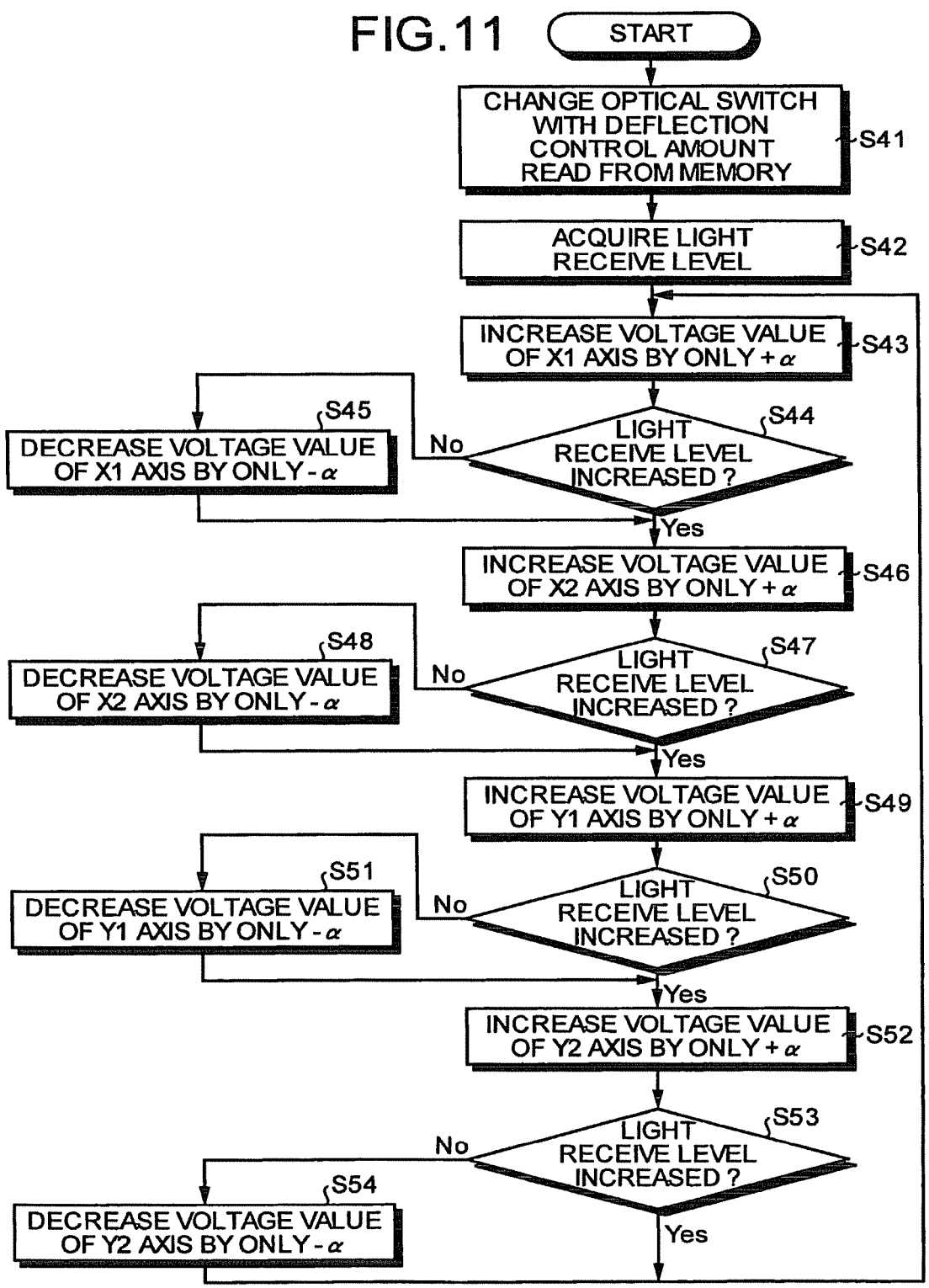
FIG. 11 is a flowchart of another control procedure for stabilizing the light output level by the optical-signal switching apparatus.

In the next place, another example of stabilization control of the light output level by the optical-signal switching apparatus is explained hereinafter. FIG. 11 is a flowchart of another control procedure for stabilizing the light output level by the optical-signal switching apparatus. In this control, with regard to the X1 axis and the Y1 axis of the input mirror 105, and the X2 axis and the Y2 axis of the output mirror 106, the process to obtain the optimal point to each axis is carried out once sequentially, and thereby the optimal point is obtained.

In the first place, the control section 23 reads the deflection control amount from the memory 25, and supplies the deflection control amount to the driving unit 24, and carries out the change of the optical switch 100 (step S41). Then, the control unit acquires the light receiving level of the optical signal of the output port corresponding to the pass whose channel has been changed from the light detector 22 (step S42). Thereafter, the control unit carries out the process to change the angle of the input mirror 105 and the output mirror 106 and detect the changes of the light receiving level of the optical signal. At this moment, with the deflection control amount read from the memory 25 as a standard, the control unit increases and decreases the deflection control amount, and changes the angle of the input mirror 105 and the output mirror 106 with the present angle as a standard.

In the first place, the driving voltage V for driving the X1 axis that is supplied to the deflecting unit of the input mirror 105 is increased only by a voltage value α to the present voltage (+α) (step S43). Then, it is judged whether the light receiving level of the optical signal has increased at the moment (step S44). The increase direction of this voltage is the plus direction of the driving voltage V shown in FIG. 4. When the light receiving level of the present optical signal has increased (step S44: Yes), the procedure goes to the control of the X2 axis of the output mirror 106 (step S46). On the other hand, when the light receiving level of the present optical signal is same or has decreased (step S44: No), the driving voltage V of the X1 axis is decreased only by the voltage value α of one time increase (−α) and made back to the original driving voltage V (step S45). The increase direction of this voltage is the minus direction of the driving voltage V shown in FIG. 4.

When the light receiving level increases, it is possible to make the light receiving level of the optical signal in the X1 axis of the input mirror 105 close to the peak P shown in FIG. 4. On the other hand, if the light receiving level becomes away from the peak P, because increasing the driving voltage V will decrease the light receiving level, the driving voltage is made back to the original driving voltage V.

In the next place, the driving voltage V for driving the X2 axis that is supplied to the deflecting unit of the output mirror 106 is increased only by a voltage value α to the present voltage (+α) (step S46). Then, it is judged whether the light receiving level of the optical signal has increased at the moment (step S47). When the light receiving level of the present optical signal has increased (step S47: Yes), the procedure goes to the control of the Y1 axis of the input mirror 105 (step S49). On the other hand, when the light receiving level of the present optical signal is same or has decreased (step S47: No), the driving voltage V of the X2 axis is decreased only by the voltage value α of one time increase (−α) and made back to the original driving voltage V (step S48).

In the next place, the driving voltage V for driving the Y1 axis that is supplied to the deflecting unit of the input mirror 105 is increased only by a voltage value α to the present voltage (+α) (step S49). Then, it is judged whether the light receiving level of the optical signal has increased at the moment (step S50). When the light receiving level of the present optical signal has increased (step S50: Yes), the procedure goes to the control of the Y2 axis of the output mirror 106 (step S52). On the other hand, when the light receiving level of the present optical signal is same or has decreased (step S50: No), the driving voltage V of the Y1 axis is decreased only by the voltage value α of one time increase (−α) and made back to the original driving voltage V (step S51).

In the next place, the driving voltage V for driving the Y2 axis that is supplied to the deflecting unit of the output mirror 106 is increased only by a voltage value α to the present voltage (+α) (step S52). Then, it is judged whether the light receiving level of the optical signal has increased at the moment (step S53). When the light receiving level of the present optical signal has increased (step S53: Yes), the procedure goes back to the step 43 again where the control of each axis is carried out once again. On the other hand, when the light receiving level of the present optical signal is same or has decreased (step S53: No), the driving voltage V of the Y2 axis is decreased only by the voltage value α of one time increase (−α) and made back to the original driving voltage V (step S54).

As mentioned above, according to the process procedures described above, the angle change of the input mirror 105 and the output mirror 106 is carried out repeatedly in the order of the X1 axis, the X2 axis, the Y1 axis, and the Y2 axis. Thereby, the angle change for each axis may be carried out sequentially in the shortest time, and the process to obtain the optimal point of a certain pass may be performed swiftly. By the way, in the structure explained above, the process to make the driving voltage V back to the original value is carried out in the step S45, the step S48, the step S51, and the step S54, however, the present invention is not limited to this, but the structure may be so made that in these steps, specified times, for example two times (−2α) of voltage is supplied to the value of the initially supplied driving voltage V, and it is judged whether the light receiving level has increased, and if the light receiving level has not increased, the driving voltage is made back to the original driving voltage V. Thereby, it is possible to obtain the optimal point by changing angles of mirror to one side, and the other (minus) side with the initially set driving voltage V as a center.

By the way, in the procedures of the light output stabilization shown in FIG. 10 and FIG. 11, the structure is so made that the angle change of the input mirror 105 and the output mirror 106 is carried out in the order of the X1 axis, the X2 axis, the Y1 axis, and the Y2 axis, however, the present invention is not limited to this, but the angle change may be made in any order, so long as it is carried out to the respective axes in a process to loop back.

Figure 12:
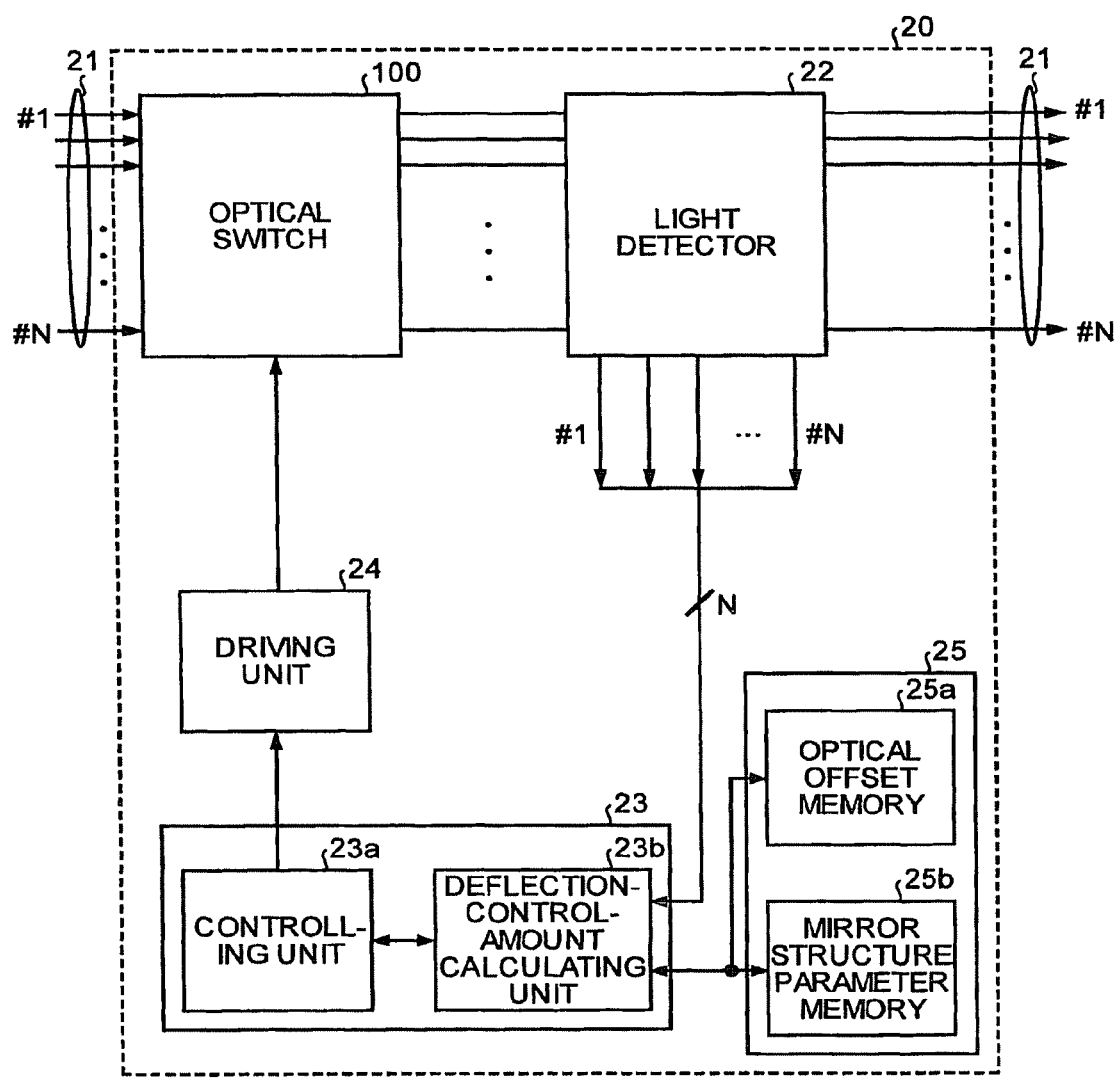
FIG. 12 is another block diagram of the optical-signal switching apparatus according to the present invention.

FIG. 12 is another block diagram of the optical-signal switching apparatus according to the present invention. A same code is allotted to a same component as in the structure in FIG. 8 explained previously.

In this structural example, the parameters to be stored into the memory 25 are the optical offset $\theta_{off}$ and the structure parameter A. These parameters are obtained as the result of the test that the optical-switch testing apparatus 1 explained by use of FIG. 1. The memory 25 includes an optical offset memory 25a that stores the optical offset $\theta_{off}$ and a mirror structure parameter memory 25b that stores the structure parameter A. The present invention is not limited to the structure shown in the figure, but another structure may be made in which a single memory 25 is employed, and the area thereof is divided into two areas, and the optical offset $\theta_{off}$ and the structure parameter A are stored in the areas respectively.

The control section 23 includes a control section 23a, and a deflection-control-amount calculating unit 23b. The deflection-control-amount calculating unit 23b reads the optical offset $\theta_{off}$ and the structure parameter A of the input and output ports corresponding to the pass of the changed channel from the memory 25, and calculates to obtain the deflection control amount on the basis of these optical offset $\theta_{off}$ and structure parameter A. This deflection control amount is the value based on the result of the test of the optical switch 100.

Then, the control section 23a outputs the obtained deflection control amount to the driving unit 24, and sets the angle of the input mirror 105 and the output mirror 106 at the moment when the optical switch 100 is changed.

Also, to the deflection-control-amount calculating unit 23b, the light receiving level of the optical signal at the output port of the corresponding pass is input. Thereby, when the optical switch 100 of the optical-signal switching apparatus 20 is switched, the light output stabilization control is performed to obtain the optimal point of the light loss in the corresponding pass.

This light output stabilization control is same as the procedures explained by use of FIG. 10 or FIG. 11, therefore, detailed explanation thereof is omitted herein. As mentioned above, also in the instance where the optical-signal switching apparatus 20 calculates to obtain the deflection control amount, it is possible to always obtain the optimal point in correspondence to changes in environment temperature and the likes.

The present invention is not limited to the embodiments mentioned above, but may be embodied in other specific forms without departing from the spirit or essential characteristics thereof. For example, the optical-signal switching apparatus 20 may be so structured that in the place of the light detector 22, a light branching coupler is arranged on the light transmission path 21 and thereby optical signals on the light transmission path 21 are branched into two paths, and a light detector that includes a PD array is arranged at the branched sides. While, in the light output stabilization control mentioned above, the structure is so made as to obtain the optimal point of the light loss in the input and output ports corresponding to the pass that has switched the optical switch. However, the present invention is not limited to this, but the control section 23 may scan all the ports while the optical-signal switching apparatus 20 is in operation and thereby carries out the light output stabilization control to each port. When the number of ports that the optical switch 100 has is large, ports may be divided into plural blocks, and the light output stabilization control described above may be performed to the ports of the plural blocks in parallel simultaneously.

In addition, the optical-signal switching apparatus 20 to which the optical switch 100 according to the present invention is arranged may change wavelength multiplexed WDM signals as they are, and change respective wavelengths after separation.

Further, the optical-switch testing method and the method concerning light output stabilization control explained above may be realized by executing a program prepared in conventional by a computer such as a personal computer or a work station. This program is recorded into various recording media, and read from such media and thereby executed. In addition, this program may be of a transferable medium that may be distributed via a network such as internet.

As mentioned above, the present invention is suitable for providing an optical-switch testing apparatus and an optical-switch testing method that enable to obtain the most suitable deflection control amounts in all the passes between input ports and output ports even with displacement at assembly of an optical switch. Further, the present invention is suitable for providing an optical-signal switching apparatus and an optical-signal switching apparatus control method that enable to reduce light loss at changing optical signals in a light transmission path.

As explained heretofore, according to the optical-switch testing apparatus under the present invention, a light path of a through pass is formed and the optical offset owing to displacement at assembly of the optical switch is calculated, accordingly, it is possible to calculate the deflection control amounts of each output port to each input port in precise manners. Further, at every formation of a cross pass, structure parameters of an input port and an output port may be calculated by use of calculated optical offsets, accordingly, even if there is fluctuation in optical characteristics of tilt mirrors, it is possible to make structure parameters even more precise. Furthermore, the number of times of the control to drive deflecting units by detecting light receiving level so as to obtain deflection control amounts may be reduced, consequently, it is possible to attain an advantageous effect that optical characteristics of an optical switch may be tested efficiently in a short time. Moreover, because structure parameters may be calculated and obtained on the basis of optical offsets for the number of input and output ports corresponding to a through pass, the data amount of these optical offsets and structure parameters may be reduced, and because the memory capacity to store data is saved, even the scale of an optical switch becomes large, the necessary capacity for the memory may be reduced, which is another advantageous effect of the present invention.

According to the optical-switch testing apparatus under the present invention, deflection control amounts are calculated by the optical characteristics of an optical switch, namely, optical offsets and structure parameters, and the optical switch is switched, therefore, light loss may be made minimum, and furthermore, because a control to obtain the optimal point of light receiving level while deflection control amounts to drive tilt mirrors are changed is carried out, as a consequence, light loss may be always made minimum even at the occurrence of changes in environment temperature and so forth, which is still another advantageous effect of the present invention.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of controlling an optical-signal switching apparatus that switches optical signals of a plurality of channels forming a light transmission path to other arbitrary channels, the method comprising:

detecting light receiving levels of optical signals output from each output port of the optical switch;

calculating deflection control amounts for changing angles of tilt mirrors of a first mirror array and a second mirror array based on default optical offsets and structure parameters of the tilt mirrors;

supplying the deflection control amounts calculated to a first deflecting unit of the first mirror array and a second deflecting unit of the second mirror array to change the angles of the tilt mirrors; and changing the deflection control amounts based on the deflection control amounts calculated and the light receiving level detected to obtain an optimal point at which the light receiving level is maximum, wherein the changing includes scanning the input ports and the output ports corresponding to all the channels of the optical switch sequentially, and to obtain the optimal point with respect to all the input ports and the output ports.

2. The method according to claim 1, wherein the changing includes changing the angles of the tilt mirrors in positive/negative direction of X axis and in positive/negative direction of Y axis to obtain the optimal point.

3. The method according to claim 1, wherein the changing includes obtaining the optimal point with respect to the input port and the output port corresponding to each other when the optical switch is switched.

4. A method of controlling an optical-signal switching apparatus that switches optical signals of a plurality of channels forming a light transmission path to other arbitrary channels including an optical switch that deflects a light path for switching optical signals between an input port and an output port corresponding to an arbitrary pass, the optical switch mounted on the optical-signal switching apparatus after having optical characteristics tested, the method comprising:
   mounting the optical switch and a memory after a test of the optical characteristics;
   detecting light receiving level of the optical signals output from each of the output ports of the optical switch;
   calculating deflection control amounts changing angles of tilt mirrors of a first mirror array and a second mirror array based on optical offsets and structure parameters stored in the memory;
   supplying the deflection control amounts calculated to a first deflecting unit of the first mirror array and a second deflecting unit of the second mirror array to change the angles of the tilt mirrors; and
   changing the deflection control amounts based on the deflection control amounts calculated and the light receiving level detected to obtain an optimal point at which the light receiving level is maximum, wherein
   the test of the optical characteristics of the optical switch includes
      inputting an optical signal to the input port;
      detecting the light receiving level of the optical signal output from the output port;
      changing deflection status of the optical switch to obtain the optimal point;
      calculating the optical offsets and the structure parameters for optimizing the deflection status based on the optimal point; and
      storing the optical offsets and the structure parameters calculated in the memory, wherein the storing includes transferring data of the optical offsets and the structure parameters into an empty memory mounted in advance.

5. A method of controlling an optical-signal switching apparatus that switches optical signals of a plurality of channels forming a light transmission path to other arbitrary channels including an optical switch that deflects a light path for switching optical signals between an input port and an output port corresponding to an arbitrary pass, the optical switch mounted on the optical-signal switching apparatus after having optical characteristics tested, the method comprising:
   mounting the optical switch and a memory after a test of the optical characteristics;
   detecting light receiving level of the optical signals output from each of the output ports of the optical switch;
   supplying the deflection control amounts calculated to a first deflecting unit of the first mirror array and a second deflecting unit of the second mirror array to change the angles of the tilt mirrors; and
   changing the deflection control amounts based on the deflection control amounts calculated and the light receiving level detected to obtain an optimal point at which the light receiving level is maximum, wherein
   the test of the optical characteristics of the optical switch includes
      inputting an optical signal to the input port;
      detecting the light receiving level of the optical signal output from the output port;
      changing deflection status of the optical switch to obtain the optimal point;
      calculating the optical offsets and the structure parameters for optimizing the deflection status based on the optimal point;
      calculating deflection control amounts changing angles of tilt mirrors of a first mirror array and a second mirror array based on optical offsets and structure parameters stored in the memory; and
      storing the deflection control amounts calculated in the memory, wherein the storing includes transferring data of the optical offsets and the structure parameters into an empty memory mounted in advance.

* * * * *

UNITED STATES PATENT AND TRADEMARK OFFICE
CERTIFICATE OF CORRECTION

| | | |
|---|---|---|
| PATENT NO. | : 7,912,329 B2 | Page 1 of 1 |
| APPLICATION NO. | : 12/542975 | |
| DATED | : March 22, 2011 | |
| INVENTOR(S) | : Yoshio Sakai et al. | |

It is certified that error appears in the above-identified patent and that said Letters Patent is hereby corrected as shown below:

On the First Page, Column 1, insert Foreign Priority data as it appears in Column 1 of the Issued Patent; -- Japanese Patent Application No. 2003-026546, filed on Feb. 3, 2003 --.

Signed and Sealed this
Fifth Day of July, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,912,329 B2 |
| APPLICATION NO. | : 12/542975 |
| DATED | : March 22, 2011 |
| INVENTOR(S) | : Yoshio Sakai et al. |

It is certified that error appears in the above-identified patent and that said Letters Patent is hereby corrected as shown below:

On the First Page, Column 1, delete Foreign Priority data "Japanese Patent Application No. 2003-026546, filed on Feb. 3, 2003".

Signed and Sealed this
Fourteenth Day of February, 2012

David J. Kappos
*Director of the United States Patent and Trademark Office*